(12) United States Patent
Okuike

(10) Patent No.: US 10,771,711 B2
(45) Date of Patent: Sep. 8, 2020

(54) IMAGING APPARATUS AND IMAGING METHOD FOR CONTROL OF EXPOSURE AMOUNTS OF IMAGES TO CALCULATE A CHARACTERISTIC AMOUNT OF A SUBJECT

(71) Applicant: SONY CORPORATION, Tokyo (JP)

(72) Inventor: Kazuyuki Okuike, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/097,913

(22) PCT Filed: Mar. 14, 2017

(86) PCT No.: PCT/JP2017/010137
§ 371 (c)(1),
(2) Date: Oct. 31, 2018

(87) PCT Pub. No.: WO2017/195459
PCT Pub. Date: Nov. 16, 2017

(65) Prior Publication Data
US 2019/0149711 A1 May 16, 2019

(30) Foreign Application Priority Data
May 10, 2016 (JP) ................. 2016-094602

(51) Int. Cl.
*H04N 5/235* (2006.01)
*G03B 15/00* (2006.01)
(Continued)

(52) U.S. Cl.
CPC .......... *H04N 5/2355* (2013.01); *G03B 7/091* (2013.01); *G03B 15/00* (2013.01); *G06T 5/50* (2013.01);
(Continued)

(58) Field of Classification Search
CPC .. H04N 5/2355; H04N 5/2258; H04N 5/2351; H04N 5/243; H04N 5/2353;
(Continued)

(56) References Cited

U.S. PATENT DOCUMENTS

2012/0062694 A1* 3/2012 Muramatsu ............... G01C 3/08
348/36
2014/0078358 A1* 3/2014 Takenaka ............. H04N 5/2357
348/294
2016/0127655 A1* 5/2016 Li ......................... H04N 5/243
348/229.1

FOREIGN PATENT DOCUMENTS

JP 11-201740 A 7/1999
JP 2003-018617 A 1/2003
(Continued)

OTHER PUBLICATIONS

International Search Report and Written Opinion of PCT Application No. PCT/JP2017/010137, dated May 30, 2017, 13 pages of ISRWO.

*Primary Examiner* — Padma Haliyur
(74) *Attorney, Agent, or Firm* — Chip Law Group

(57) ABSTRACT

Provided is an imaging apparatus that includes a first imaging section that sequentially shoots a plurality of images including a first image, a second imaging section that shoots at least one image including a second image, a signal processor that synthesizes the plurality of images shot by the first imaging section, a characteristic amount calculator that calculates a characteristic amount of a subject based on the first image and the second image, and an exposure amount controller that controls exposure amounts of the first imaging section and the second imaging section to reduce a difference between the exposure amount of the first image and the exposure amount of the second image.

18 Claims, 20 Drawing Sheets

(51) Int. Cl.
 *G03B 7/091* (2006.01)
 *H04N 5/243* (2006.01)
 *H04N 5/225* (2006.01)
 *G06T 5/50* (2006.01)
 *H04N 13/204* (2018.01)

(52) U.S. Cl.
 CPC ......... *H04N 5/2258* (2013.01); *H04N 5/2351* (2013.01); *H04N 5/2353* (2013.01); *H04N 5/243* (2013.01); *G06T 2207/10144* (2013.01); *G06T 2207/20208* (2013.01); *H04N 13/204* (2018.05)

(58) Field of Classification Search
 CPC ...... H04N 13/204; G03B 7/091; G03B 15/00; G03B 35/08; G03B 19/22; G06T 5/50; G06T 2207/10144; G06T 2207/20208
 See application file for complete search history.

(56) References Cited

FOREIGN PATENT DOCUMENTS

| | | |
|---|---|---|
| JP | 2006-254470 A | 9/2006 |
| JP | 2011-254170 A | 12/2011 |
| JP | 2015-207944 A | 11/2015 |

\* cited by examiner

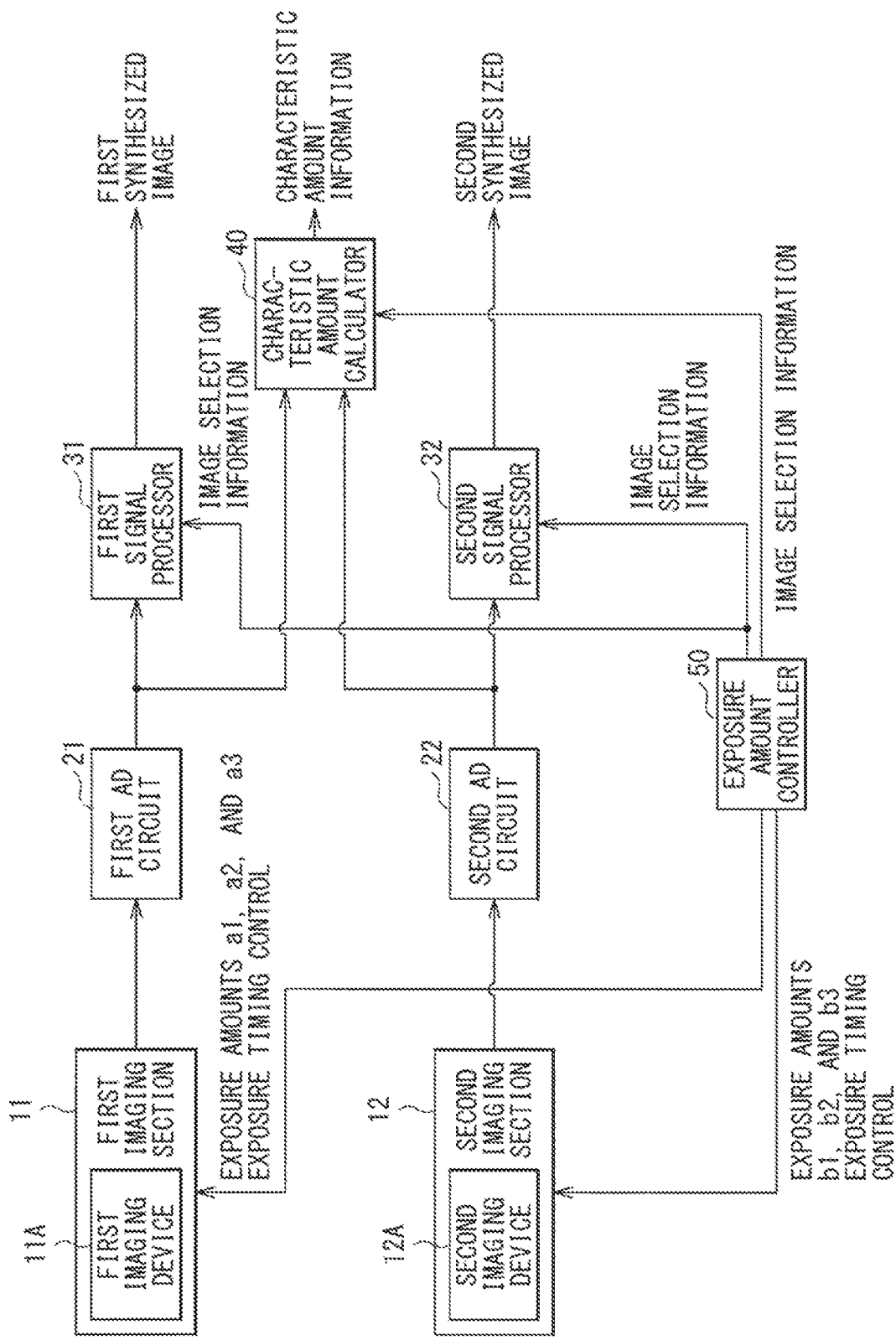

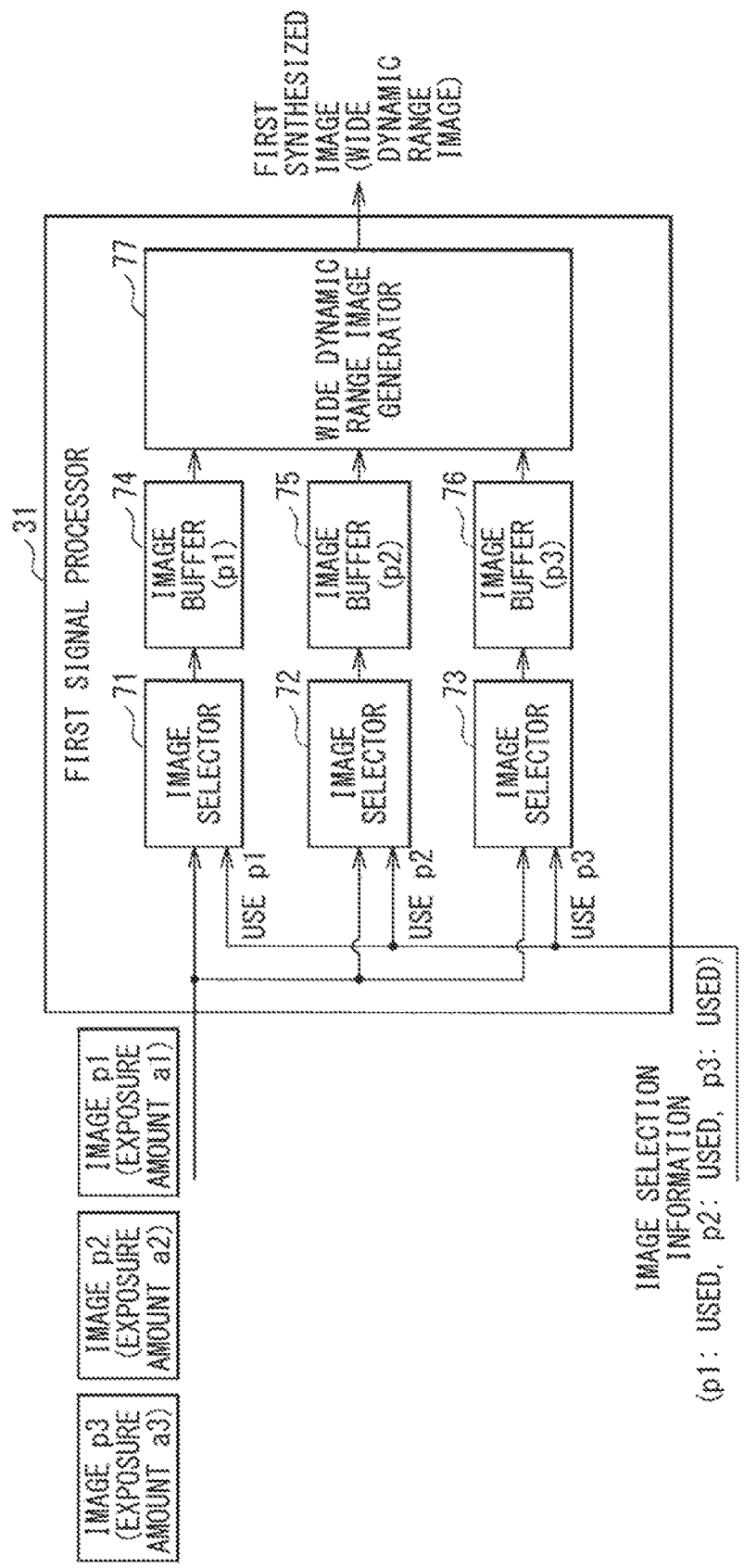

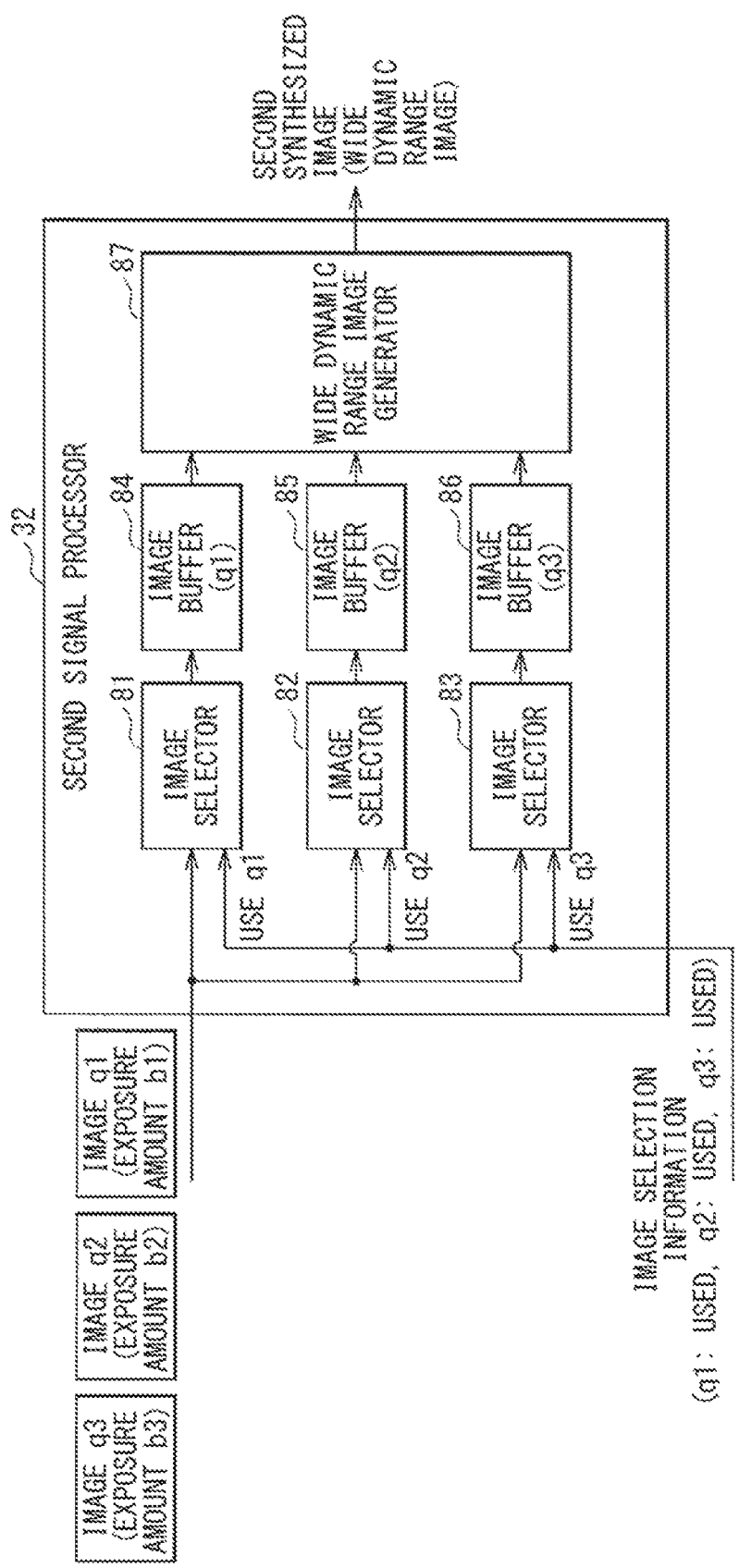

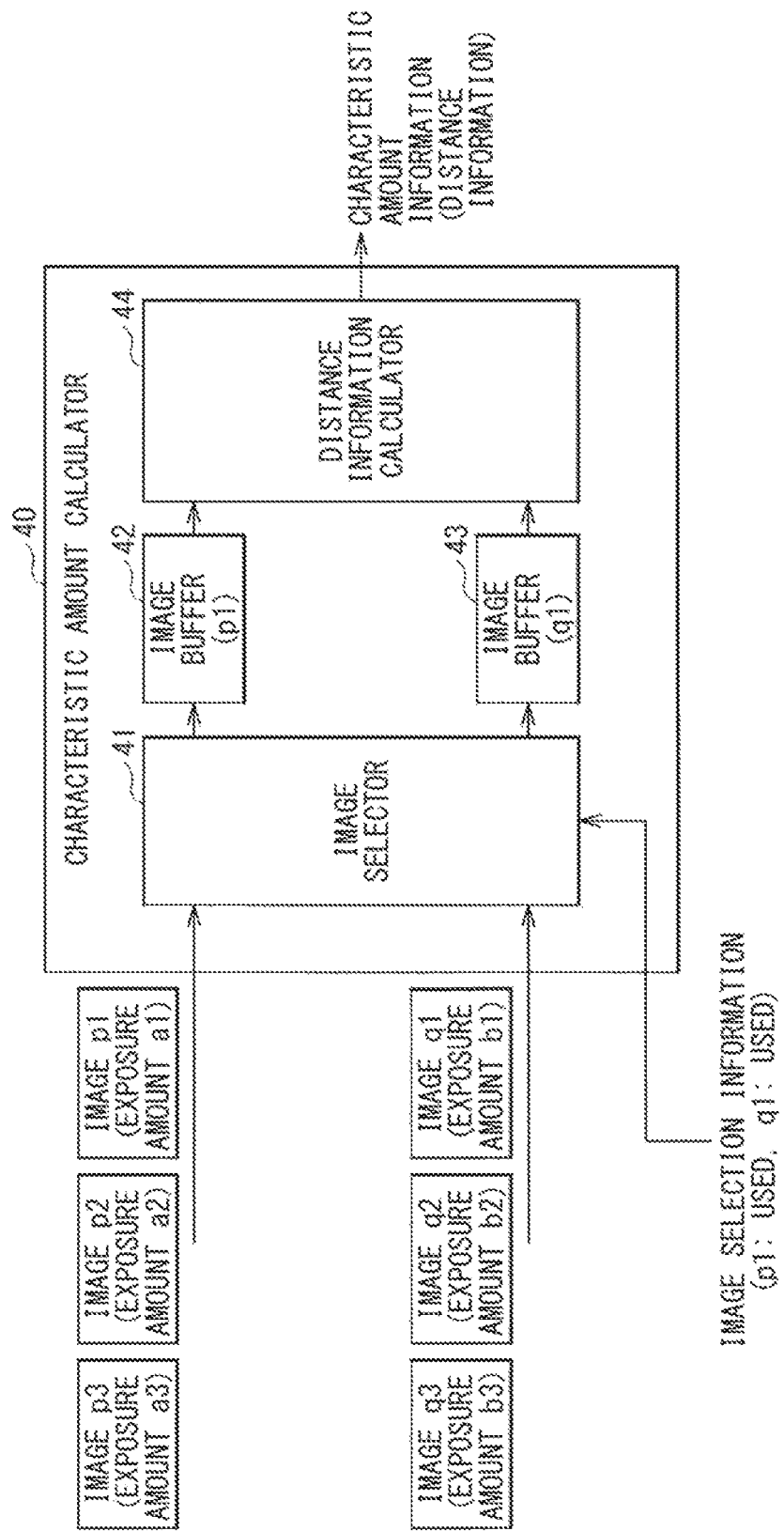

[FIG. 5]
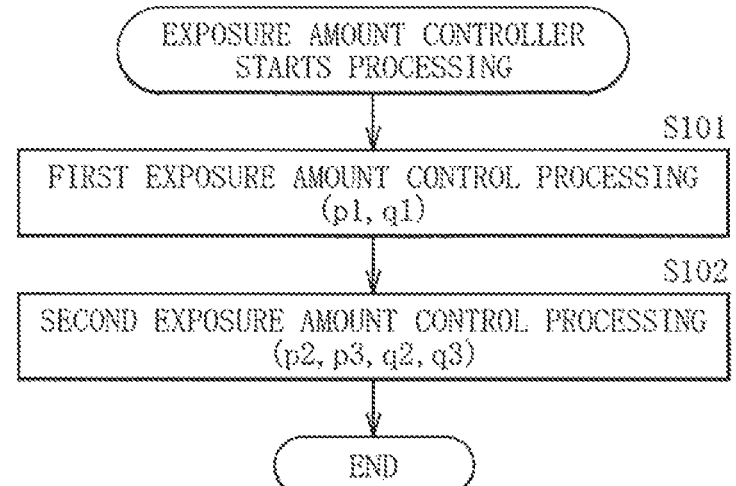
[FIG. 6]
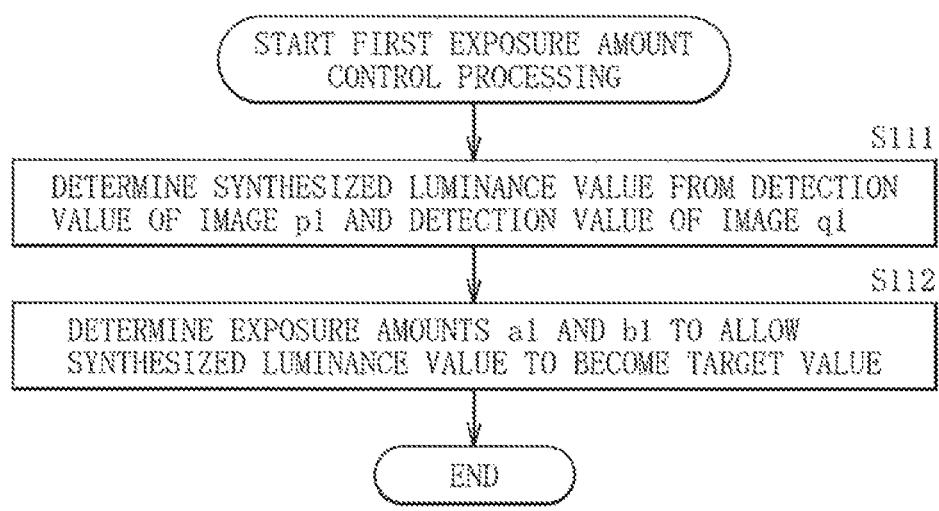

[FIG. 7]
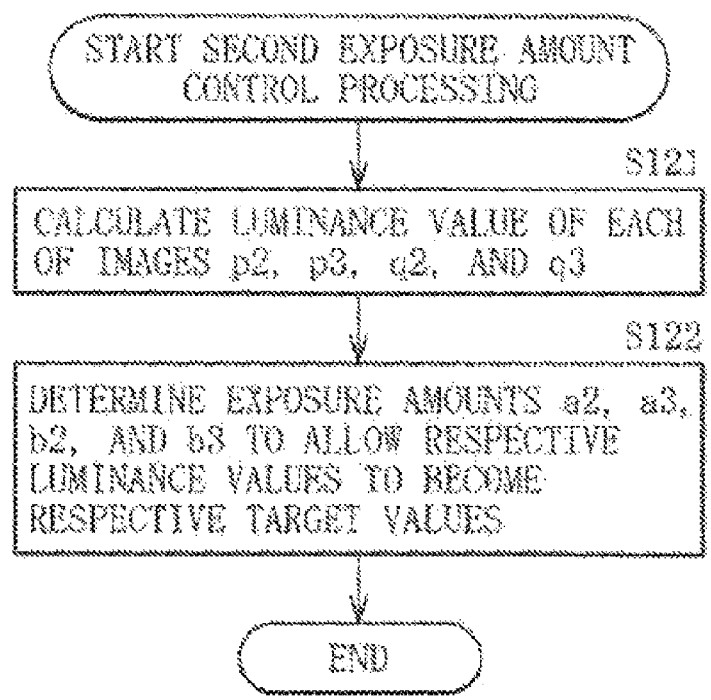

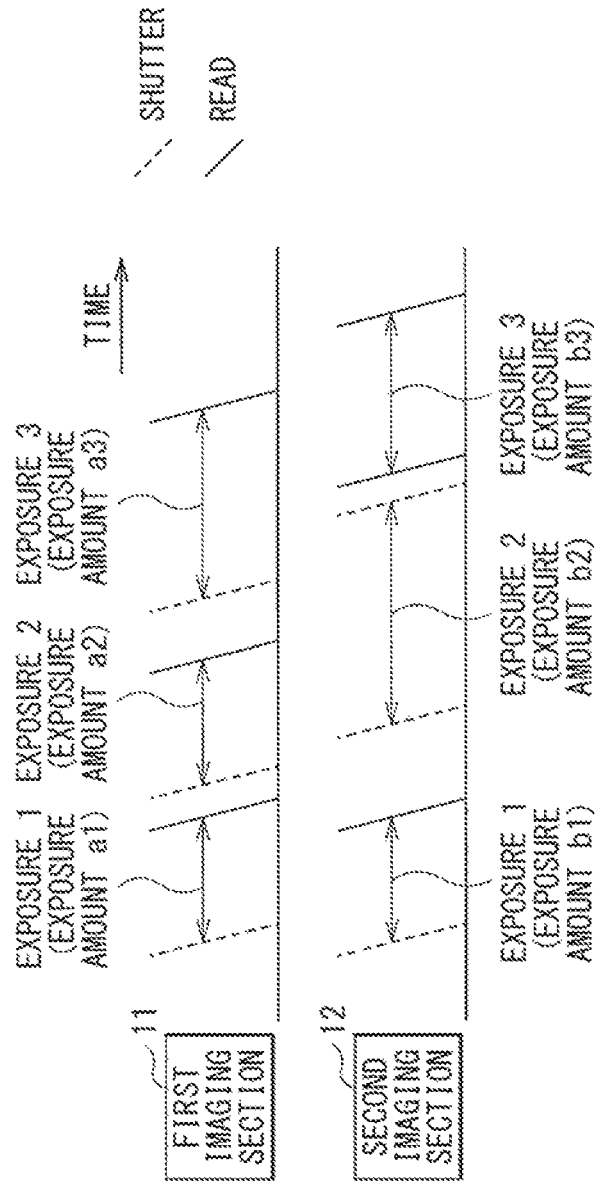
[FIG. 8]

[FIG. 9]
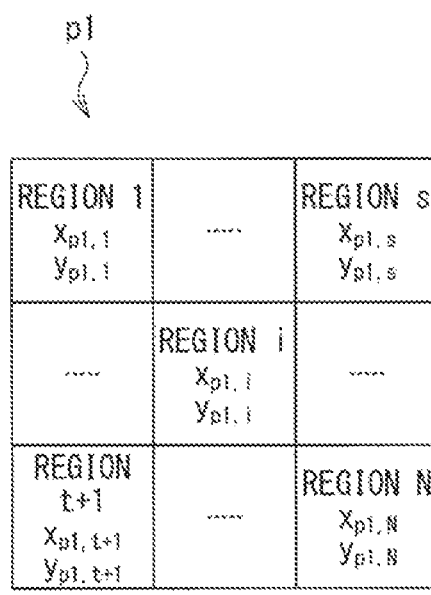
[FIG. 10]
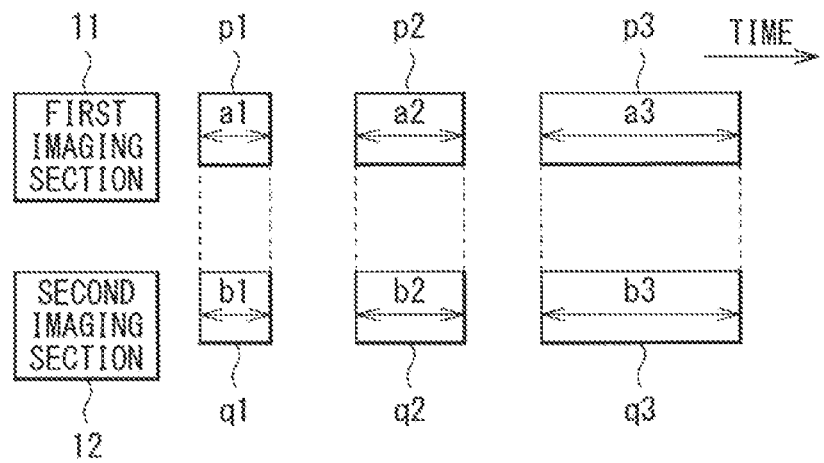

[ FIG. 11 ]
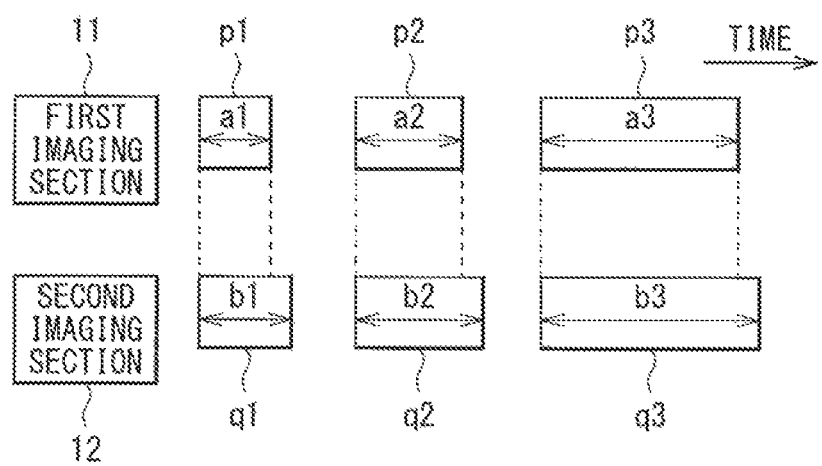
[ FIG. 12 ]
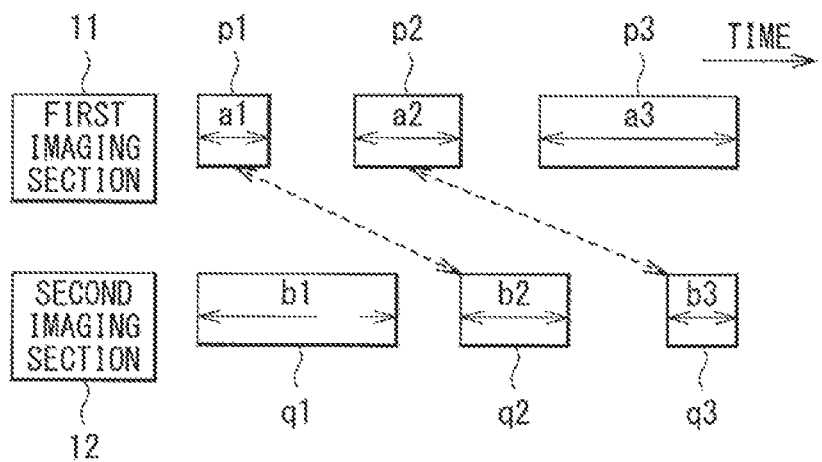

[FIG. 13]
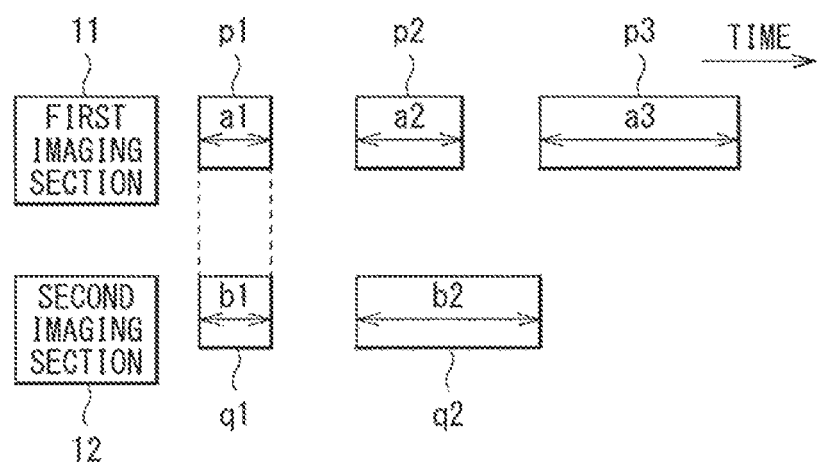
[FIG. 14]
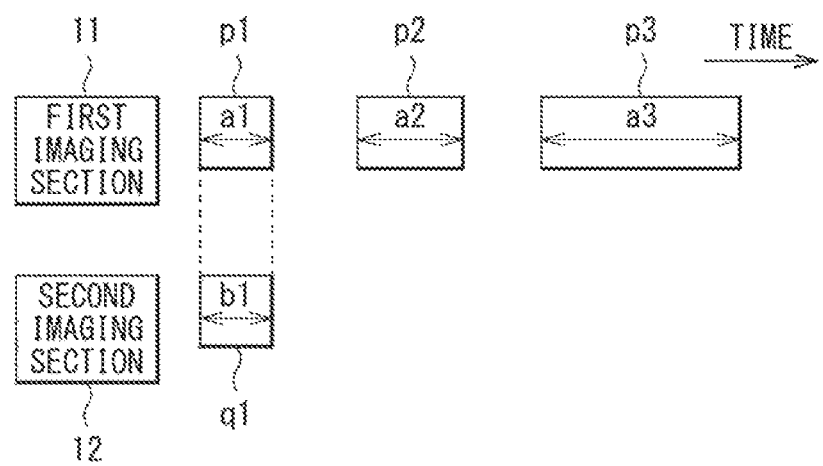

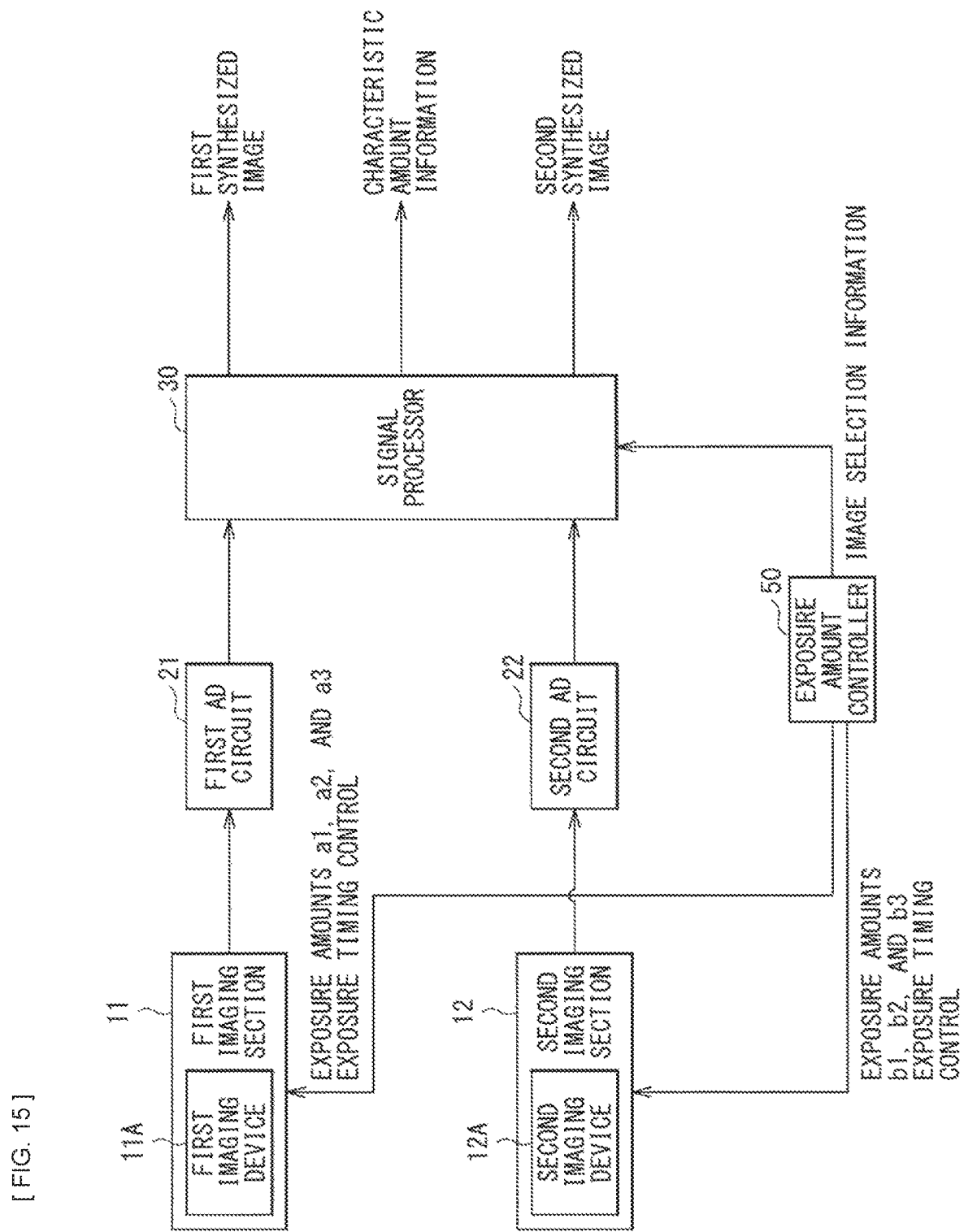
[FIG. 15]

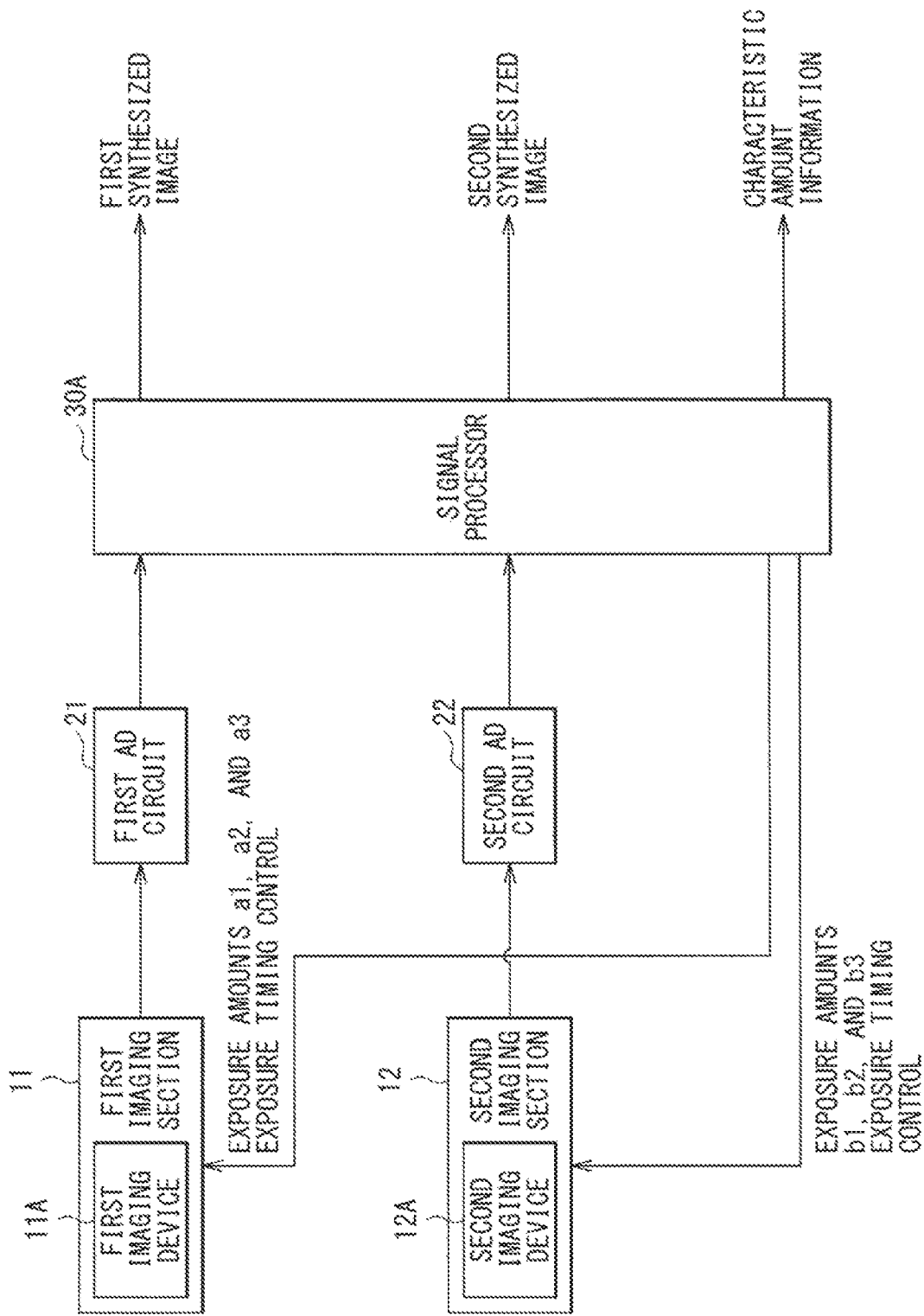

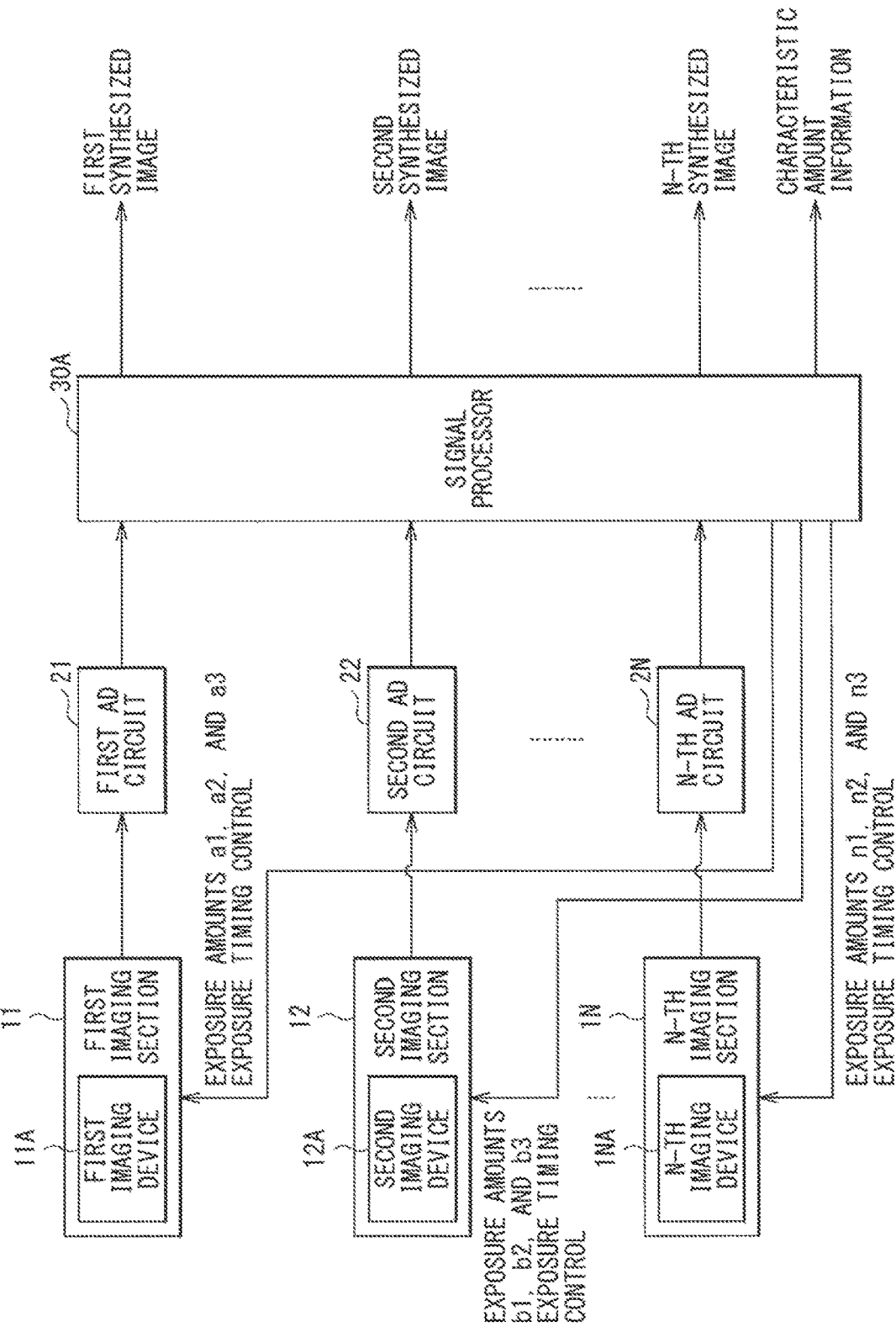

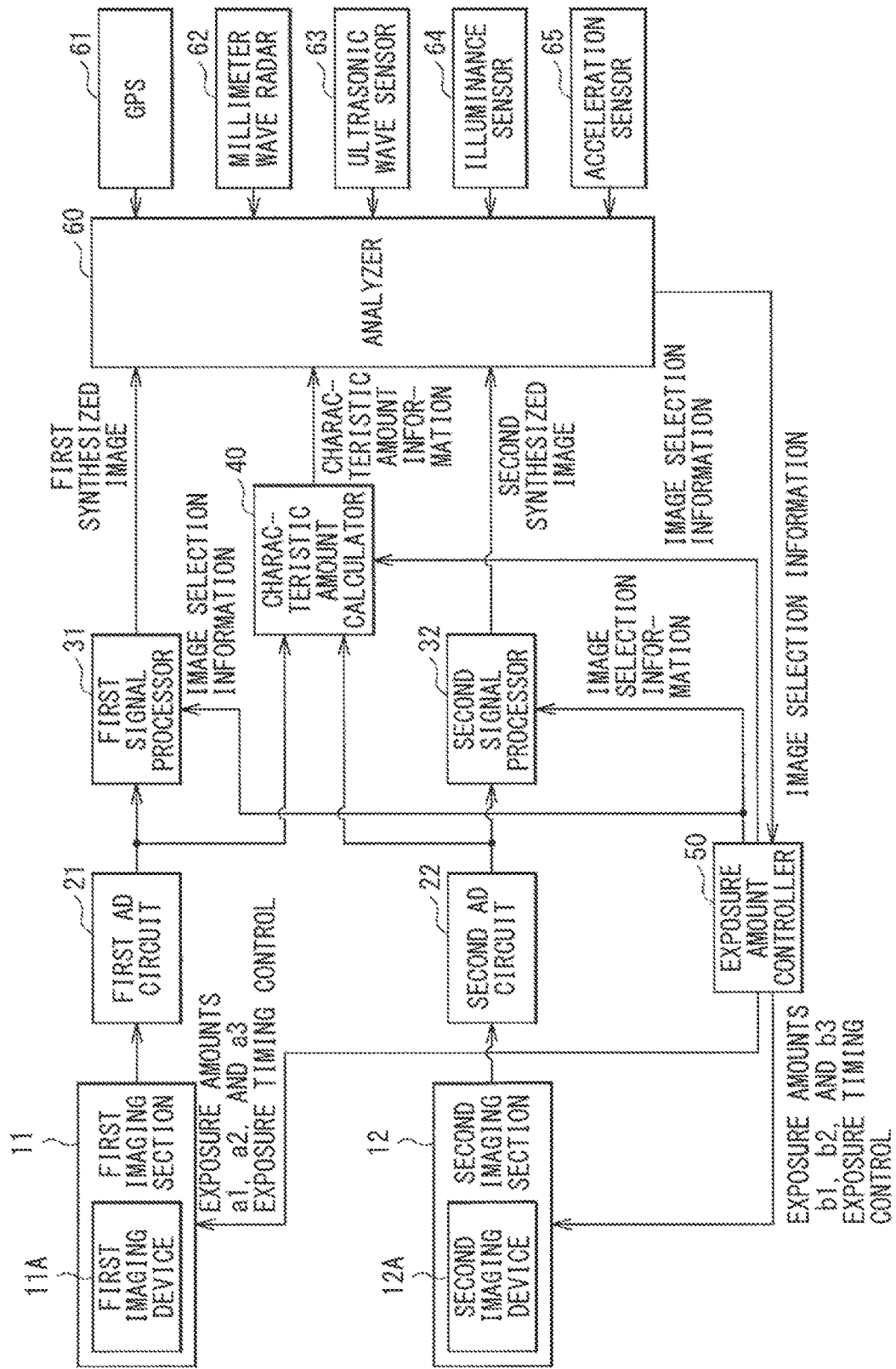
[FIG. 18]

[ FIG. 19 ]
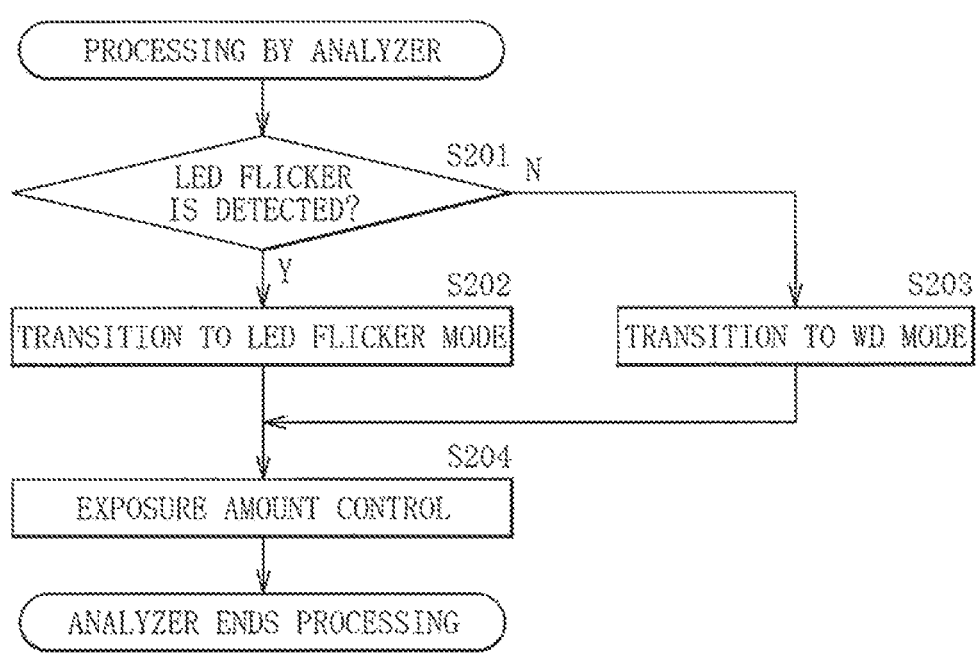

[FIG. 20]
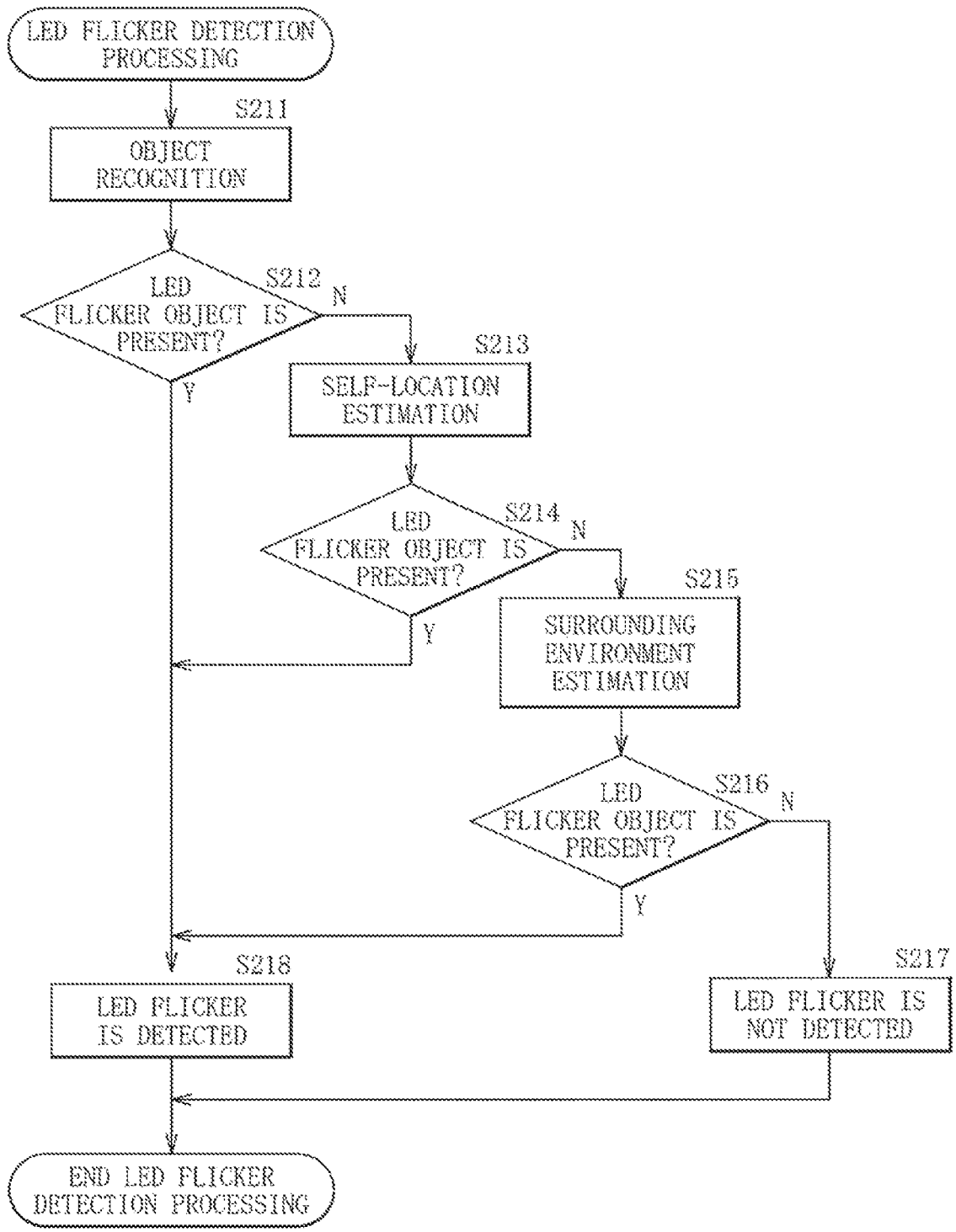

[FIG. 21]
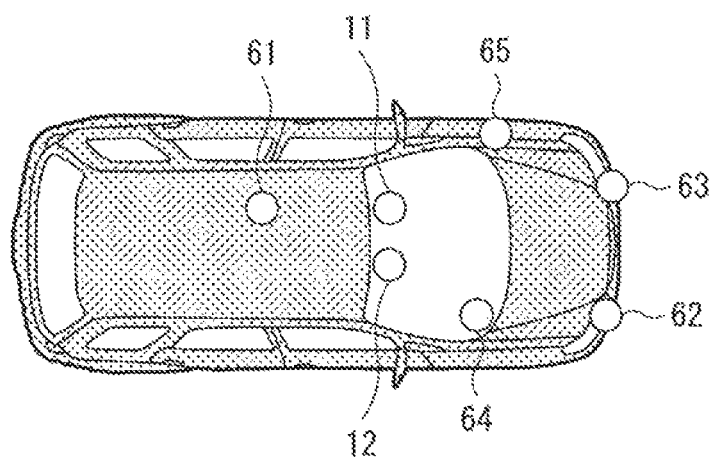
[FIG. 22]
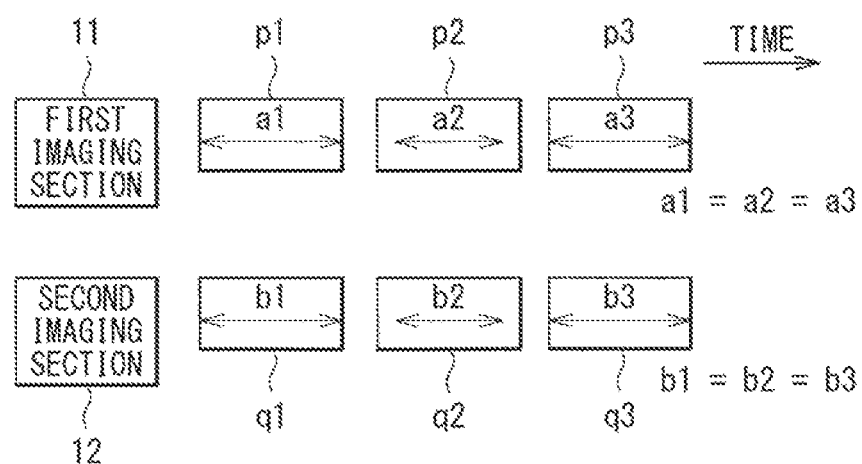

[FIG. 23]
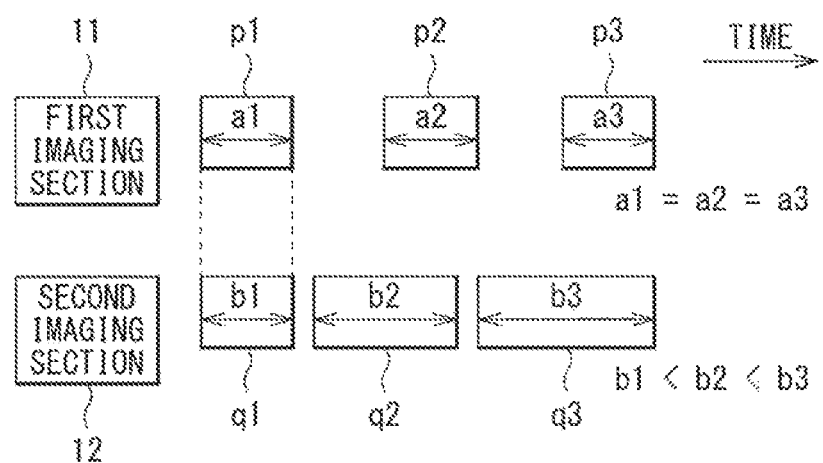

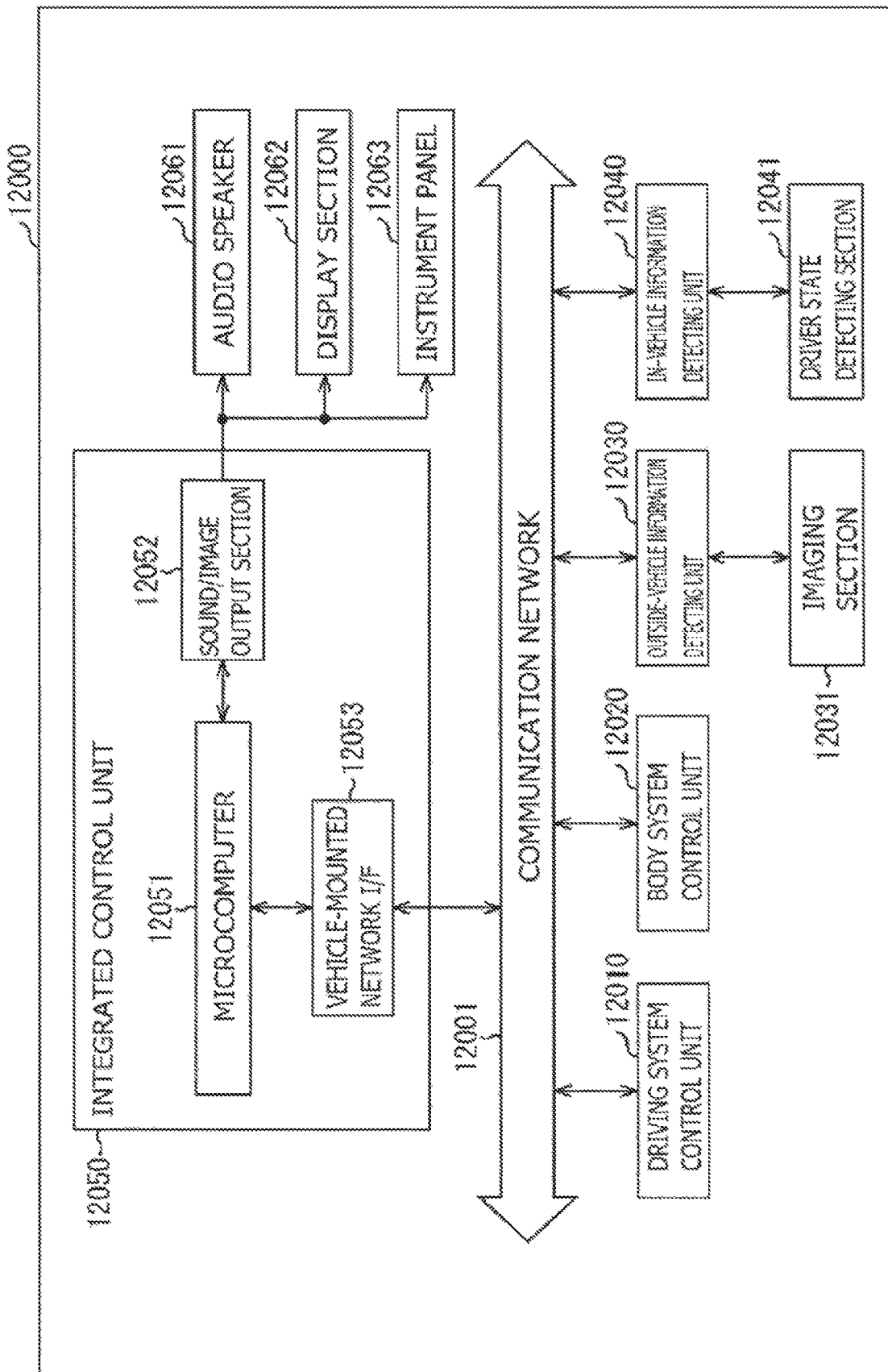
[FIG. 24]

[ FIG. 25 ]
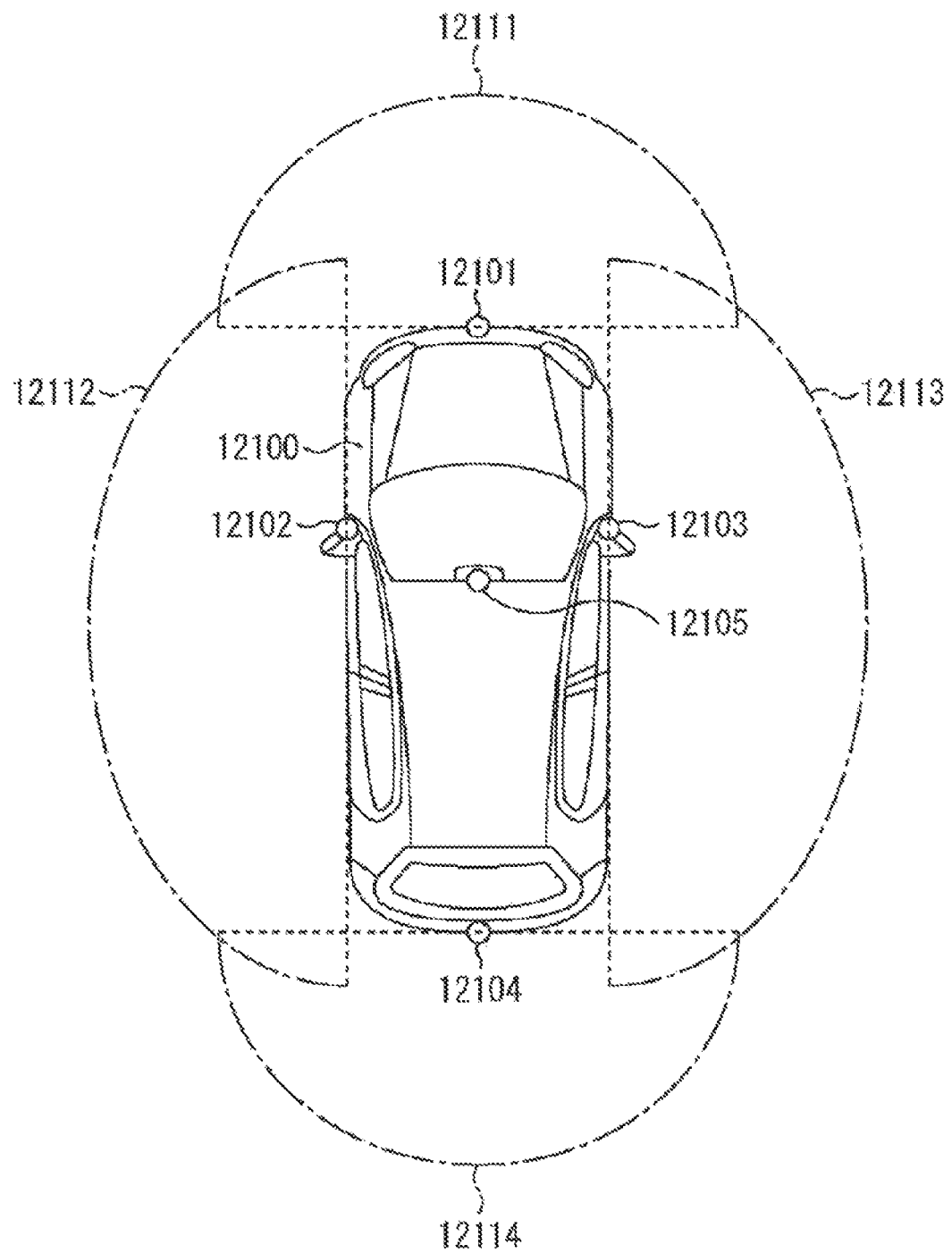

IMAGING APPARATUS AND IMAGING METHOD FOR CONTROL OF EXPOSURE AMOUNTS OF IMAGES TO CALCULATE A CHARACTERISTIC AMOUNT OF A SUBJECT

CROSS REFERENCE TO RELATED APPLICATIONS

This application is a U.S. National Phase of International Patent Application No. PCT/JP2017/010137 filed on Mar. 14, 2017, which claims priority benefit of Japanese Patent Application No. JP 2016-094602 filed in the Japan Patent Office on May 10, 2016. Each of the above-referenced applications is hereby incorporated herein by reference in its entirety.

TECHNICAL FIELD

The present disclosure relates to an imaging apparatus that shoots a plurality of images, and an imaging method.

BACKGROUND ART

There has been proposed technology of an imaging apparatus that is allowed to simultaneously perform generation of a wide dynamic range image and measurement of a distance to a subject on the basis of a plurality of images having parallax and different exposure amounts.

CITATION LIST

Patent Literature

PTL 1: Japanese Unexamined Patent Application Publication No. 2011-254170

SUMMARY OF THE INVENTION

However, it is difficult to perform distance measurement with high accuracy while generating a wide dynamic range image.

It is desirable to provide an imaging apparatus that is allowed to calculate a characteristic amount of a subject with high accuracy while generating a wide dynamic range image, and an imaging method.

An imaging apparatus according to an embodiment of the present disclosure includes: a first imaging section that sequentially shoots a plurality of images including a first image; a second imaging section that shoots at least one image including a second image; a signal processor that synthesizes the plurality of images shot by the first imaging section; a characteristic amount calculator that calculates a characteristic amount of a subject on the basis of the first image and the second image; and an exposure amount controller that controls exposure amounts of the first imaging section and the second imaging section to reduce a difference between the exposure amount of the first image and the exposure amount of the second image.

An imaging method according to an embodiment of the present disclosure includes: sequentially shooting a plurality of images including a first image by a first imaging section; shooting at least one image including a second image by a second imaging section; synthesizing the plurality of images shot by the first imaging section; calculating a characteristic amount of a subject on the basis of the first image and the second image; and controlling the first imaging section and the second imaging section to reduce a difference between an exposure amount of the first image and an exposure amount of the second image.

In the imaging apparatus or the imaging method according to the embodiment of the present disclosure, the first imaging section sequentially shoots the plurality of images including the first image, and the second imaging section shoots at least one image including the second image. The first imaging section and the second imaging section are controlled to reduce a difference between the exposure amount of the first image and the exposure amount of the second image.

According to the imaging apparatus or the imaging method according to the embodiment of the present disclosure, a difference between the exposure amounts of the first image and the second image used for calculation of the characteristic amount of the subject is reduced, which makes it possible to calculate the characteristic amount of the subject with high accuracy while generating a wide dynamic range image.

It is to be noted that effects described here are not necessarily limited and may include any of effects described in the present disclosure.

BRIEF DESCRIPTION OF THE DRAWINGS

FIG. 1 is a block diagram illustrating a configuration example of an imaging apparatus according to a first embodiment of the present disclosure.

FIG. 2 is a block diagram illustrating a configuration example of a first signal processor in the imaging apparatus illustrated in FIG. 1.

FIG. 3 is a block diagram illustrating a configuration example of a second signal processor in the imaging apparatus illustrated in FIG. 1.

FIG. 4 is a block diagram illustrating a configuration example of a characteristic amount calculator in the imaging apparatus illustrated in FIG. 1.

FIG. 5 is a flow chart illustrating an example of exposure amount control by an exposure amount controller in the imaging apparatus illustrated in FIG. 1.

FIG. 6 is a flow chart illustrating an example of first exposure amount control processing by the exposure amount controller in the imaging apparatus illustrated in FIG. 1.

FIG. 7 is a flow chart illustrating an example of second exposure amount control processing by the exposure amount controller in the imaging apparatus illustrated in FIG. 1.

FIG. 8 is an explanatory diagram of exposure amounts and exposure timings in each of a first imaging section and a second imaging section.

FIG. 9 is an explanatory diagram illustrating an example of a detection frame used for calculation of a luminance value.

FIG. 10 is an explanatory diagram illustrating a first example of the exposure amounts and the exposure timings in each of the first imaging section and the second imaging section.

FIG. 11 is an explanatory diagram illustrating a second example of the exposure amounts and the exposure timings in each of the first imaging section and the second imaging section.

FIG. 12 is an explanatory diagram illustrating a third example of the exposure amounts and the exposure timings in each of the first imaging section and the second imaging section.

FIG. 13 is an explanatory diagram illustrating a fourth example of the exposure amounts and the exposure timings in each of the first imaging section and the second imaging section.

FIG. 14 is an explanatory diagram illustrating a fifth example of the exposure amounts and the exposure timings in each of the first imaging section and the second imaging section.

FIG. 15 is a block diagram illustrating a configuration example of an imaging apparatus according to a second embodiment.

FIG. 16 is a block diagram illustrating a configuration example of an imaging apparatus according to a third embodiment.

FIG. 17 is a block diagram illustrating a configuration example of an imaging apparatus according to a fourth embodiment.

FIG. 18 is a block diagram illustrating a configuration example of an analysis system using an imaging apparatus according to a fifth embodiment.

FIG. 19 is a flow chart illustrating an example of processing by an analyzer in the analysis system illustrated in FIG. 18.

FIG. 20 is a flow chart illustrating an example of a procedure of LED flicker detection processing in the analysis system illustrated in FIG. 18.

FIG. 21 is a configuration diagram illustrating a mounting example of various kinds of sensors to a vehicle.

FIG. 22 is an explanatory diagram illustrating a first example of the exposure amounts and the exposure timings in each of the first imaging section and the second imaging section in a case where measures against LED flicker is taken.

FIG. 23 is an explanatory diagram illustrating a second example of the exposure amounts and the exposure timings in each of the first imaging section and the second imaging section in the case where measures against LED flicker is taken.

FIG. 24 is a block diagram depicting an example of schematic configuration of a vehicle control system.

FIG. 25 is a diagram of assistance in explaining an example of installation positions of an outside-vehicle information detecting section and an imaging section.

MODES FOR CARRYING OUT THE INVENTION

In the following, some embodiments of the present disclosure are described in detail with reference to the drawings. It is to be noted that description is given in the following order.

1. First Embodiment (an imaging apparatus that is allowed to perform distance measurement with high accuracy while generating a wide dynamic range image)
 1.1 Configuration (FIGS. 1 to 4)
 1.2 Operation (FIGS. 5 to 14)
 1.3 Effects
2. Second Embodiment (FIG. 15)
3. Third Embodiment (FIG. 16)
4. Fourth Embodiment (FIG. 17)
5. Fifth Embodiment (an analysis system using an imaging apparatus) (FIGS. 18 to 23)
6. Sixth Embodiment (an application example to a mobile body) (FIGS. 24 and 25)
7. Other Embodiments 1. First Embodiment There has been proposed technology of an imaging apparatus that is allowed to simultaneously perform generation of a wide dynamic range image and measurement of a distance to a subject on the basis of a plurality of images having parallax and different exposure amounts. In this technology, in a case where, in order to obtain a wide dynamic range, image distance measurement is performed with use of two images having different exposure amounts, an image having a smaller exposure amount is multiplied by a gain to cause the two images to have equal brightness, and thereafter, the distance measurement is performed. Hence, distance measurement accuracy is deteriorated due to noise amplified through multiplying by the gain. Moreover, even in a case where the exposure amounts are different and a case where images having been subjected to image processing including non-linear processing having different parameters are used, it is difficult to perform distance measurement with high accuracy. In contrast, in a case where two images having an equal exposure amount are used to enhance distance measurement accuracy, it is difficult to obtain a wide dynamic range image.

In the present embodiment, there is therefore provided technology of an imaging apparatus that is allowed to perform distance measurement with high accuracy while generating a wide dynamic range image.

[1.1 Configuration]

FIG. 1 illustrates a configuration example of an imaging apparatus according to a first embodiment of the present disclosure.

The imaging apparatus according to the present embodiment includes a first imaging section 11, a second imaging section 12, a first AD (analog-to-digital) circuit 21, a second AD circuit 22, a first signal processor 31, a second signal processor 32, a characteristic amount calculator 40, and an exposure amount controller 50.

The first imaging section 11 includes a first imaging device 11A. The second imaging section 12 includes a second imaging device 12A. The first imaging device 11A and the second imaging device 12A are disposed at positions different from each other. This causes an image shot by the first imaging device 11A and an image shot by the second imaging device 12A to have parallax therebetween.

The first signal processor 31 includes a plurality of image selectors 71, 72, and 73, a plurality of image buffers 74, 75, and 76, and a wide dynamic range image generator 77, as illustrated in FIG. 2.

The second signal processor 32 includes a plurality of image selectors 81, 82, and 83, a plurality of image buffers 84, 85, and 86, a wide dynamic range image generator 87, as illustrated in FIG. 3.

The characteristic amount calculator 40 includes an image selector 41, a plurality of image buffers 42 and 43, and a distance information calculator 44, as illustrated in FIG. 4.

[1.2 Operation]

The first imaging section 11 sequentially shoots a plurality of images. Each of the plurality of images shot by the first imaging section 11 is converted into a digital signal by the first AD circuit 21, and the digital signal is inputted into the first signal processor 31. The first signal processor 31 synthesizes the plurality of images, and outputs a first synthesized image having an enlarged dynamic range.

Likewise, the second imaging section 12 sequentially shoots a plurality of images. Each of the plurality of images shot by the second imaging section 12 is converted into a digital signal by the second AD circuit 22, and the digital signal is inputted into the second signal processor 32. The second signal processor 32 synthesizes the plurality of images, and outputs a second synthesized image having an enlarged dynamic range.

Moreover, the characteristic amount calculator 40 calculates distance information as characteristic amount information on the basis of one image (a first image) of the plurality of images shot by the first imaging section 11 and one image (a second image) of the plurality of images shot by the second imaging section 12.

The exposure amount controller 50 performs control of exposure amounts and exposure timings on the first imaging section 11 and the second imaging section 12. Moreover, the exposure amount controller 50 executes control of image selection on the first signal processor 31, the second signal processor 32, and the characteristic amount calculator 40.

Three images p1, p2, and p3 respectively shot with exposure amounts a1, a2, and a3 are inputted from the first imaging section 11 to the first signal processor 31 via the first AD circuit 21, as illustrated in FIG. 2. The first signal processor 31 selects images to be used for wide dynamic range synthesis on the basis of image selection information notified by the exposure amount controller 50. In the present embodiment, wide dynamic range synthesis is performed with use of, for example, the three images p1, p2, and p3, and a first synthesized image is outputted.

Three images q1, q2, and q3 respectively shot with exposure amounts b1, b2, and b3 are inputted from the second imaging section 12 to the second signal processor 32 via the second AD circuit 22, as illustrated in FIG. 3. The second signal processor 32 selects images to be used for wide dynamic range synthesis on the basis of image selection information notified by the exposure amount controller 50. In the present embodiment, wide dynamic range synthesis is performed with use of, for example, the three images q1, q2, and q3, and a second synthesized image is outputted.

The characteristic amount calculator 40 selects an image to be used for calculation of a characteristic amount of a subject on the basis of image selection information notified by the exposure amount controller 50. In the present embodiment, the exposure amount controller 50 performs control to cause, for example, the exposure amount a1 of the image p1 and the exposure amount b1 of the image q1 to be substantially equal to each other. The characteristic amount calculator 40 calculates distance information as characteristic amount information of the subject on the basis of, for example, two images p1 and q1, which have the exposure amounts caused to be substantially equal to each other, of the three images p1, p2, and p3 shot by the first imaging section 11 and the three images q1, q2, and q3 shot by the second imaging section 12.

The exposure amount controller 50 serves as a controller that determines the exposure amounts a1, a2, and a3 and the exposure amounts b1, b2, and b3.

FIG. 5 illustrates an example of exposure amount control by the exposure amount controller 50. FIG. 6 illustrates an example of first exposure amount control processing by the exposure amount controller 50. FIG. 7 illustrates an example of second exposure amount control processing by the exposure amount controller 50.

The exposure amount controller 50 performs the first exposure amount control processing (step S101) and the second exposure amount control processing (step S102). The first exposure amount control processing is related to control of exposure amounts of images to be used for calculation of the characteristic amount by the characteristic amount calculator 40. The exposure amount controller 50 determines, for example, the exposure amount a1 of the image p1 and the exposure amount b1 of the image q1 by the first exposure amount control processing. The second exposure amount control processing is related to control of exposure amounts of remaining images. The exposure amount controller 50 determines, for example, the exposure amounts a2 and a3 of the images p2 and p3 and the exposure amounts b2 and b3 of the images q2 and q3 by the second exposure amount control processing. It is to be noted that the first exposure amount control processing (step S101) and the second exposure amount control processing (step S102) may be performed simultaneously, or may be performed in reversed order.

The exposure amount controller 50 first performs, as the first exposure amount control processing, processing for determining a synthesized luminance value from a detection value of the image p1 and a detection value of the image q1 (step S111). Thereafter, the exposure amount controller 50 determines the exposure amounts a1 and b1 to allow the synthesized luminance value to become a target value (step S112).

The exposure amount controller 50 first calculates, for example, a luminance value of each of the images p2 and p3 and the images q2 and q3 as the second exposure amount control processing (step S121). Thereafter, the exposure amount controller 50 determines the exposure amounts a2 and a3 and the exposure amounts b2 and b3 to allow the luminance value of each of the images to become a target value (step S122).

FIG. 8 illustrates an example of exposure amounts and exposure timings in each of the first imaging section 11 and the second imaging section 12. FIG. 8 illustrates shutter timings and image readout timings (read timings) in each of the first imaging section 11 and the second imaging section 12. The exposure amount controller 50 has a function of making determination to allow one of the exposure amounts a1, a2, and a3 to become substantially equal to one of the exposure amount b1, b2, and b3. In particular, it is desirable to adjust the exposure timings so as to satisfy a1=b1, that is, so as for the first imaging section 11 and the second imaging section 12 to first expose images having a substantially equal exposure amount. This makes it possible to obtain data of an accurate characteristic amount. However, the exposure amount controller 50 does not necessarily perform control to cause the exposure amount a1 and the exposure amount b1 to be completely equal to each other, and may perform control to reduce a difference between the exposure amount a1 and the exposure amount b1 to an extent to which the characteristic amount is calculable with high accuracy. Likewise, the exposure amount controller 50 does not necessarily perform control to cause the exposure timing of the image p1 and the exposure timing of the image q1 to be completely coincident with each other, and may perform control to reduce a difference between the exposure timings of the images p1 and q1 to an extent to which the characteristic value is calculable with high accuracy.

Moreover, in the exposure amount controller 50, upon determining the exposure amount a1 and the exposure amount b1, a combination of i and j in which a difference between target values is smallest is selected as described later, which minimizes an influence on images to be subjected to wide dynamic range synthesis. The exposure amount controller 50 has restrictions on the first imaging section 11 and the second imaging section 12 as devices such as a restriction that it is necessary to first take an image having a longer exposure time, and in a case where it is not possible to satisfy a1=b1, the exposure amount controller 50 has a function of determining the exposure amounts to satisfy a1=b2, a2=b3, or the like within the restrictions on the devices. As a procedure of determining the exposure amount, the exposure amount is controlled to cause a luminance value to become a target value.

A summary of the above-described control of the exposure amounts by the exposure amount controller 50 is described in execution order as follows.

(1) A combination in which a difference between target values is minimum is determined.

The exposure amount controller 50 determines the combination of i and j in which a target value |Evref_ai−Evref_bj| is minimum. Here, Evref_ai indicates a target value for determination of an exposure amount ai (i=1 to 3), and Evref_bi indicates a target value for determination of an exposure amount bi (i=1 to 3).

(2) Values Evref are changed to first expose the combination in which the difference between the target values are minimum.

The exposure amount controller 50 replaces respective values Evref in which a difference between the determined target values is minimum with values Evref_a1 and Evref_b1. However, in a case where the values Evref are not changeable due to restrictions on the devices such as a restriction that the exposure amounts necessarily satisfy a1>a2>a3, the values Evref are not changed.

Evref_a1←Evref_ai (the value Evref_ai determined in (1) is replaced with Evref_a1)

Evref_a1←Evref_ai (Evref_ai is replaced with Evref_a1, thereby replacing original Evref_a1 with Evref_ai)

Evref_b1←Evref_bj (the value Evref_bj determined in (1) is replaced with Evref_b1)

Evref_bj←Evref_b1 (Evref_bj is replaced with Evref_b1, thereby replacing original Evref_b1 with Evref_bj)

(3) A target synthesized value is determined.

The exposure amount controller 50 determines a target synthesized value Evref_com from the values Evref_a1 and Evref_b1. As a determining method, there are a method using an average of the two values and a method using one of the two values as a target synthesized value.

In a case where it is desired to cause the exposure amounts to be equal to each other such as a1=b1, the exposure amount controller 50 determines a synthesized luminance value through calculating the following g(x, y) with use of detection values of the image p1 and the image q1, and calculates the exposure amounts to allow the synthesized luminance value to become the target synthesized value Evref_com. The exposure amount controller 50 applies the determined exposure amounts to a1 and b1, thereby causing a1 and b2 to become exposure amounts substantially equal to each other.

In contrast, regarding each of a2, a3, b2 and b3, a luminance value is independently calculated from an average of detection values such as the following f(x), and the exposure amount is independently calculated to allow the luminance value to become the target value.

FIG. 9 illustrates an example of a detection frame used for calculation of the luminance value. As illustrated in FIG. 9, for example, in a case where respective pixels of the image p1 are divided into a plural number N (s rows and t columns) of regions, a total of luminance values included in a region (detection frame) i is $x_{p1,j}$. Moreover, the number of pixels included in the region i is $y_{p1,j}$.

An average luminance value f(p1) of the image p1 is determined by the following expression (1).

[Math. 1]

$$f(p1) = \frac{\sum_{}^{N} x_{p1,i}}{\sum_{}^{N} y_{p1,i}} \qquad (1)$$

A synthesized luminance value g(p1, q1) is determined from the detection value of the image p1 and the detection value of the image q1 by the following (A) to (E).

(A) In a case where an average of the luminance value of the image p1 and the luminance value of the image q1 is used as the synthesized luminance value

[Math. 2]

$$g(p1, q1) = \frac{f(p1) + f(q1)}{2} \qquad \text{Expression (A)}$$

(B) In a case where each of the luminance value of the image p1 and the luminance value of the image q1 is determined, and a larger luminance value is used as the synthesized luminance value

[Math. 3]

$$g(p1, q1) = \max(f(p1), f(q1)) \qquad \text{Expression (B)}$$

$$\text{when } \max(x, y) = \begin{cases} x & (\text{if}: x \geq y) \\ y & (\text{if}: x < y) \end{cases}$$

(C) In a case where a larger one of an average luminance value in each detection frame of the image p1 and an average luminance value in each detection frame of the image q1 is added up, and a sum total thereby obtained is used as the synthesized luminance value

[Math. 4]

$$g(p1, q1) = \sum^{N} \max\left(\frac{x_{p1,i}}{y_{p1,i}}, \frac{x_{q1,i}}{y_{q1,i}}\right) \qquad \text{Expression (C)}$$

$$\text{when } \max(x, y) = \begin{cases} x & (\text{if}: x \geq y) \\ y & (\text{if}: x < y) \end{cases}$$

(D) In a case where each of the luminance value of the image p1 and the luminance value of the image q1 is determined, and a smaller luminance value is used as the synthesized luminance value

[Math. 5]

$$g(p1, q1) = \min(f(p1), f(q1)) \qquad \text{Expression (D)}$$

$$\text{when } \min(x, y) = \begin{cases} x & (\text{if}: x \geq y) \\ y & (\text{if}: x < y) \end{cases}$$

(E) In a case where a smaller one of an average luminance value in each detection frame of the image p1 and an average luminance value in each detection frame of the image q1 is added up, and a sum total thereby obtained is used as the synthesized luminance value

[Math. 6]

$$g(p1, q1) = \sum^{N} \min\left(\frac{x_{p1,i}}{y_{p1,i}}, \frac{x_{q1,i}}{y_{q1,i}}\right) \quad \text{Expression (E)}$$

$$\text{when max } (x, y) = \begin{cases} x & (\text{if: } x \geq y) \\ y & (\text{if: } x < y) \end{cases}$$

Shutter speed and a gain are determined on the basis of the exposure amounts determined in the above-described manner, and the first imaging section 11 and the second imaging section 12 perform shooting. A method of converting the exposure amounts into the shutter speed and the gain may be an existing frequently used method in which the shutter speed and the gain are determined from a table, or any other method.

(Variations of Control of Exposure Amounts and Exposure Timings)

FIGS. 10 to 14 illustrate first to fifth examples of the exposure amounts and the exposure timings in each of the first imaging section 11 and the second imaging section 12.

For example, the exposure amount controller 50 may perform control to cause the exposure amounts a1, a2, and a3 of the images p1, p2, and p3 shot by the first imaging section 11 and the exposure amounts b1, b2, and b3 of the images q1, q2, and q3 shot by the second imaging section 12 to be substantially equal to each other and to cause the exposure timings of the images p1, p2, and p3 and the exposure timings of the images q1, q2, and q3 to be substantially coincident with each other. Moreover, in order to generate the first synthesize image having an enlarged dynamic range, the exposure amount controller 50 may perform control to cause the exposure amounts a1, a2, and a3 to be different from one another. In this case, the exposure amount controller 50 may perform control to cause the exposure amounts a1, a2, and a3 to satisfy a1<a2<a3. Likewise, in order to generate the second synthesized image having an enlarged dynamic range, the exposure amount controller 50 may perform control to cause the exposure amounts b1, b2, and b3 to be different from each other. In this case, the exposure amount controller 50 may perform control to cause the exposure amounts b1, b2, and b3 to satisfy b1<b2<b3.

The exposure amount controller 50 may perform control to cause, for example, the exposure amounts a1, a2, and a3 and the exposure timings of the images p1, p2, and p3 shot by the first imaging section 11 and the exposure amounts b1, b2, and b3 and the exposure timings of the images q1, q2, and q3 shot by the second imaging section 12 to be different from each other, as illustrated in FIG. 11. However, the exposure amount controller 50 desirably reduces, for example, a difference between the exposure amount a1 and the exposure amount b1 to an extent to which the characteristic amount is calculable.

The exposure amount controller 50 may perform control to cause the exposure amounts a1, a2, and a3 of the images p1, p2, and p3 shot by the first imaging section 11 to satisfy a1<a2<a3, as illustrated in FIG. 12. In other words, the exposure amounts may be controlled to become larger in order. In contrast, the exposure amounts b1, b2, and b3 of the images q1, q2, and q3 shot by the second imaging section 12 may be controlled to satisfy b1>b2>b3. In other words, the exposure amounts may be controlled to become smaller in order. In this case, a difference between the first exposure amount a1 and the first exposure amount b1 is largest, which is not suitable for calculation of the characteristic amount. Hence, the exposure amount controller 50 may perform control to reduce, for example, a difference between the first exposure amount a1 in the first imaging section 11 and the second exposure amount b2 in the second imaging section 12 to an extent to which the characteristic amount is calculable. Moreover, the exposure amount controller 50 may perform control to reduce, for example, a difference between the second exposure amount a2 in the first imaging section 11 and the third exposure amount b3 in the second imaging section 12 to an extent to which the characteristic amount is calculable.

A case where three images p1, p2, and p3 are sequentially shot by the first imaging section 11 and three images q1, q2, and q3 are sequentially shot by the second imaging section 12 is described above as an example; however, the number of images shot by each imaging section is not limited thereto. Moreover, the number of images shot by the first imaging section 11 and the number of images shot by the second imaging section 12 may be different from each other.

For example, as illustrated in FIG. 13, three images p1, p2, and p3 may be shot by the first imaging section 11, and two images q1 and q2 may be shot by the second imaging section 12.

Further, for example, as illustrated in FIG. 14, three images p1, p2, and p3 may be shot by the first imaging section 11, and one image q1 may be shot by the second imaging section 12. Note that in this case, it is not possible to obtain a wide dynamic range image from the image shot by the second imaging section 12.

[1.3 Effects]

As described above, according to the present embodiment, for example, a difference between the exposure amount a1 of the image p1 shot by the first imaging section 11 and the exposure amount b1 of the image q1 shot by the second imaging section 12 is reduced, which makes it possible to calculate the characteristic amount of the subject with high accuracy while generating a wide dynamic range image.

According to the present embodiment, even in a case where exposure settings different for the first imaging section 11 and the second imaging section 12 are performed, it is possible to generate a wide dynamic range image and accurately execute distance measurement with use of images of frames at the same time. In existing technology, it is considered that accuracy is deteriorated due to influences of noise by the gain and non-linear processing. In contrast, in the present technology, a deterioration in accuracy is suppressed.

It is to be noted that the effects described in the description are merely illustrative and non-limiting, and other effects may be included. This applies to effects achieved by the following other embodiments.

2. Second Embodiment

Next, description is given of an imaging apparatus according to a second embodiment of the present disclosure. It is to be noted that components substantially same as those of the imaging apparatus according to the foregoing first embodiment are denoted by same reference numerals, and description thereof is omitted as appropriate.

FIG. 15 illustrates a configuration example of the imaging apparatus according to the second embodiment.

The imaging apparatus according to the present embodiment includes one signal processor 30 that serves as the first signal processor 31, the second signal processor 32, and the characteristic amount calculator 40 in the above-described configuration example of the imaging apparatus in FIG. 1.

In the present embodiment, the signal processor 30 may calculate the characteristic amount on the basis of the first synthesized image and the second synthesized image. In this case, for example, the exposure amount controller 50 desirably synchronizes the exposure amounts and the exposure timings of the plurality of images shot by the first imaging section 11 and the exposure amounts and the exposure timings of the plurality of images shot by the second imaging section 12 with each other, as illustrated in FIG. 10.

Other configurations, operations, and effects may be substantially similar to those in the imaging apparatus according to the foregoing first embodiment.

3. Third Embodiment

Next, description is given of an imaging apparatus according to a third embodiment of the present disclosure. It is to be noted that components substantially same as those of the imaging apparatus according to the foregoing first or second embodiment are denoted by same reference numerals, and description thereof is omitted as appropriate.

FIG. 16 illustrates a configuration example of the imaging apparatus according to the third embodiment.

The imaging apparatus according to the present embodiment includes one signal processor 30A that serves as the first signal processor 31, the second signal processor 32, the characteristic amount calculator 40, and the exposure amount controller 50 in the above-described configuration example of the imaging apparatus in FIG. 1.

Other configurations, operations, and effects may be substantially similar to those in the imaging apparatus according to the foregoing first or second embodiment.

4. Fourth Embodiment

Next, description is given of an imaging apparatus according to a fourth embodiment of the present disclosure. It is to be noted that components substantially same as those of the imaging apparatus according to the foregoing first, second, or third embodiment are denoted by same reference numerals, and description thereof is omitted as appropriate.

FIG. 17 illustrates a configuration example of the imaging apparatus according to the fourth embodiment.

The imaging apparatus according to the present embodiment is a configuration example in which the first and second imaging sections 11 and 12 and the first and second AD circuits 21 and 22 in the above-described configuration example of the imaging apparatus in FIG. 16 are increased in number to N (=an integer of 3 or more).

The imaging apparatus according to the present embodiment further includes an N-th imaging section 1N and an N-th AD circuit 2N. The N-th imaging section 1N includes an N-th imaging device 1NA. The signal processor 30A outputs the number N of synthesized images.

Other configurations, operations, and effects may be substantially similar to those in the imaging apparatus according to the foregoing first, second, or third embodiment.

<5. Fifth Embodiment> (Analysis System Using Imaging Apparatus)

Next, description is given of a fifth embodiment of the present disclosure. It is to be noted that components substantially same as those of the imaging apparatuses according to the foregoing first to fourth embodiments are denoted by same reference numerals, and description thereof is omitted as appropriate.

FIG. 18 illustrates a configuration example of an analysis system using an imaging apparatus according to a fifth embodiment.

The analysis system according to the present embodiment further includes an analyzer 60 and various kinds of sensors in addition to the above-described imaging apparatus in FIG. 1. The first synthesized image, the second synthesized image, and characteristic amount information from the imaging apparatus and sensor information from the various kinds of sensors are inputted into the analyzer 60.

The analysis system according to the present embodiment has, as shooting modes, a shooting mode (an WD mode) used to perform wide dynamic range (WD) synthesis and a shooting mode (an LED flicker mode) for measures against LED (light emitting diode:) flicker. The analyzer 60 performs exposure amount control by the exposure amount controller 50 in accordance with the shooting modes.

The various kinds of sensors include, for example, a GPS (Global Positioning System) 61, a millimeter wave radar 62, an ultrasonic wave sensor 63, an illuminance sensor 64, and an acceleration sensor 65. FIG. 21 illustrates a mounting example of the various kinds of sensors to a vehicle; however, mounting positions of the various kinds of sensors and the mounting number of the various kinds of sensors are not limited to the illustrated example.

FIG. 19 illustrates an example of processing by the analyzer 60 in the analysis system illustrated in FIG. 18. In the analyzer 60, first, the presence or absence of LED flicker is detected (step S201). In a case where LED flicker is detected (step S201: Y), the analyzer 60 makes transition to the LED flicker mode (step S202). In a case where LED flicker is not detected (step S201: N), the analyzer 60 makes transition to the WD mode (step S203). In the analyzer 60, exposure amount control by the exposure amount controller 50 is performed in accordance with the shooting mode (step S204).

FIG. 22 illustrates a first example of the exposure amounts and the exposure timings in each of the first imaging section 11 and the second imaging section 12 in a case where measures against LED flicker is taken. In the LED flicker mode, in order to suppress an LED flicker phenomenon, the exposure amounts a1, a2, and a3 of the images p1, p2, and p3 shot by the first imaging section 11 are desirably substantially equal to one another. Likewise, in the LED flicker mode, in order to suppress the LED flicker phenomenon, the exposure amounts b1, b2, and b3 of the images q1, q2, and q3 shot by the second imaging section 12 are desirably substantially equal to one another. It is possible for the first signal processor 31 to synthesize the plurality of images p1, p2, and p3 having a substantially equal exposure amount, thereby generating the first synthesized image in which the flicker phenomenon is suppressed. Likewise, it is possible for the second signal processor 32 to synthesize the plurality of images q1, q2, and q3 having a substantially equal exposure amount, thereby generating the second synthesized image in which the flicker phenomenon is suppressed.

FIG. 23 illustrates a second example of the exposure amounts and the exposure timings in each of the first imaging section 11 and the second imaging section in the case where measures against LED flicker is taken. An example in which both the first imaging section 11 and the second imaging section 12 are in the LED flicker mode is illustrated in FIG. 22; however, the exposure amount controller 50 may perform exposure amount control in which one of the first imaging section 11 and the second imaging section 12 is in the LED flicker mode and the other is in the WD mode on the basis of an analysis result by the analyzer 60. For example, the exposure amount controller 50 may perform exposure amount control in which the first imaging section 11 is in the LED flicker mode and the second imaging section 12 is in the WD mode. In this case, for example, as illustrated in FIG. 23, in order to suppress the LED flicker phenomenon, the exposure amounts a1, a2, and a3 of the images p1, p2, and p3 shot by the first imaging section 11 may be substantially equal to one another. In contrast, in order to generate the second synthesized image having an enlarged dynamic range, the exposure amounts b1, b2, and b3 of the images q1, q2, and q3 shot by the second imaging section 12 may be different from one another. Moreover, in this case, the exposure amount controller 50 desirably performs exposure amount control to cause one of the exposure amounts a1, a2, and a3 to be substantially equal to one of the exposure amounts b1, b2, and b3 to an extent to which the characteristic amount is calculable. In the example in FIG. 23, an example in which the exposure amount a1 and the exposure amount b1 are substantially equal to each other is illustrated.

FIG. 20 illustrates an example of a procedure of LED flicker detection processing in the analysis system illustrated in FIG. 18.

First, the analyzer 60 executes object recognition with use of the first synthesized image, the second synthesized image, and the characteristic amount information (step S211). Next, the analyzer 60 determines whether or not an LED flicker object is present (step S212). The analyzer 60 determines that the LED flicker object is present in a case where an object (for example, a traffic light, a sign, a tail light of a car, etc.) to be subjected to the measures against LED flicker is present among objects subjected to the object recognition. In a case where the analyzer 60 determines that the LED flicker object is present as a result of the object recognition (step S212: Y), the analyzer 60 considers that LED flicker is detected (step S218).

In a case where the analyzer 60 determines that the LED flicker object is not present as the result of the object recognition (step S212: N), the analyzer 60 next executes self-location estimation with use of the result of the object recognition and information of the acceleration sensor 65 and the GPS 60 (step S213) to determine whether or not the LED flicker object is present (step S214). The analyzer 60 confirms whether or not an object (for example, a traffic light, a sign, etc.) to be subjected to the measures against LED flicker is present at a current location in comparison with an execution result of the self-location estimation and map information held in advance, and in a case where the object is present, the analyzer 60 considers that the LED flicker object is present. In a case where the analyzer 60 determines that the LED flicker object is present on the basis of the execution result of the self-location estimation (step S214: Y), the analyzer 60 considers that LED flicker is detected (step S218).

In a case where the analyzer 60 determines that the LED flicker object is not present on the basis of the execution result of the self-location estimation (step S214: N), the analyzer 60 next executes surrounding environment estimation with use of the millimeter wave radar 62 and the ultrasonic wave sensor 63 (step S215) to determine whether or not the LED flicker object is present (step S216). The analyzer 60 determines whether or not an object (for example, a tail light, etc.) to be subjected to the measures against LED flicker is present nearby on the basis of the surrounding environment estimation, and in a case where in consideration of information of the illuminance sensor 64, illuminance is equal to or lower than specific illuminance and the object is present, the analyzer 60 considers that the LED flicker object is present. In a case where the analyzer 60 determines that the LED flicker object is present on the basis of the surrounding environment estimation (step S216: Y), the analyzer 60 considers that LED flicker is detected (step S218). In a case where the analyzer 60 determines that the LED flicker object is not present on the basis of the surrounding environment estimation (step S216: N), the analyzer 60 considers that LED flicker is not detected (step S217).

The characteristic amount information calculated by the characteristic amount calculator 40 is applicable to object recognition (car detection, white line recognition, pedestrian detection, and traffic light detection, etc.), as with the present embodiment. The object recognition in this case may be characteristic amount information based on an image shot by one of the first imaging section 11 and the second imaging section 12. Moreover, the characteristic amount information based on an image shot by one imaging section may be used for object tracking, etc. Further, characteristic amount information based on a plurality of images shot by two or more imaging sections may be used for distance measurement, self-location estimation (SLAM), etc.

<6. Sixth Embodiment> (Application Example to Mobile Body)

The technology (the present technology) according to the present disclosure is applicable to various products. For example, the technology according to the present disclosure may be achieved in the form of an apparatus to be mounted to a mobile body of any kind. Examples of the mobile body may include an automobile, an electric vehicle, a hybrid electric vehicle, a motorcycle, a bicycle, a personal mobility, an airplane, an unmanned aerial vehicle, a vessel, and a robot.

FIG. 24 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 24, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 24, an audio speaker 12061, a display section 12062, and an instrument panel 12063 are illustrated as the output device. The display section 12062 may, for example, include at least one of an on-board display and a head-up display.

FIG. 25 is a diagram depicting an example of the installation position of the imaging section 12031.

In FIG. 25, the vehicle 12100 includes imaging sections 12101, 12102, 12103, 12104, and 12105 as the imaging section 12031.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. Images of the front obtained by the imaging sections 12101 and 12105 are used mainly to detect a preceding vehicle, a pedestrian, an obstacle, a signal, a traffic sign, a lane, or the like.

Incidentally, FIG. 25 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

In the foregoing, the description has been given of one example of the vehicle control system to which the technology according to the present disclosure can be applied.

The first imaging section and the second imaging section in the technology according to the present disclosure may be applied to the imaging section 12031 in FIG. 24. Moreover, the first imaging section and the second imaging section in the technology according to the present disclosure is applicable to each of the imaging sections 12101, 12102, 12103, 12104, and 12105 in FIG. 25. Further, functions of the signal processor, the characteristic amount calculator, and the exposure amount controller in the technology according to the present disclosure are achievable by the microcomputer 12051. Applying the technology according to the present disclosure to the vehicle control system makes it possible to calculate a characteristic amount of a subject with high accuracy and accurately execute distance measurement, etc.

7. Other Embodiments

The technology achieved by present disclosure is not limited to description of the foregoing respective embodiments, and may be modified in a variety of ways.

The present technology may have the following configurations, for example.

(1)

An imaging apparatus, including:

a first imaging section that sequentially shoots a plurality of images including a first image;

a second imaging section that shoots at least one image including a second image;

a signal processor that synthesizes the plurality of images shot by the first imaging section;

a characteristic amount calculator that calculates a characteristic amount of a subject on the basis of the first image and the second image; and an exposure amount controller that controls exposure amounts of the first imaging section and the second imaging section to reduce a difference between the exposure amount of the first image and the exposure amount of the second image.

(2)

The imaging apparatus according to (1), in which the exposure amount controller controls the first imaging section and the second imaging section to reduce a difference between an exposure timing of the first image and an exposure timing of the second image.

(3)

The imaging apparatus according to (1) or (2), in which the first image is an image that is first shot of the plurality of images.

(4)

The imaging apparatus according to any one of (1) to (3), in which the exposure amount controller controls the first imaging section to cause exposure amounts of the plurality of images to be different from one another, and the signal processor synthesizes the plurality of images to generate a synthesized image having an enlarged dynamic range.

(5)

The imaging apparatus according to any one of (1) to (3), in which the exposure amount controller controls the first imaging section to cause exposure amounts of the plurality of images to be equal to one another, and the signal processor synthesizes the plurality of images to generate a synthesized image in which a flicker phenomenon is suppressed.

(6)

The imaging apparatus according to any one of (1) to (3), in which the exposure amount controller controls the first imaging section to cause exposure amounts of the plurality of images to be equal to or different from one another on the basis of a flicker detection result.

(7)

The imaging apparatus according to any one of (1) to (6), in which the second imaging section sequentially shoots a plurality of images including the second image, and the signal processor synthesizes the plurality of images shot by the first imaging section to generate a first synthesized image, and synthesizes the plurality of images shot by the second imaging section to generate a second synthesized image.

(8)

The imaging apparatus according to (7), in which the characteristic amount calculator calculates the characteristic amount of the subject on the basis of the first synthesized image and the second synthesized image.

(9)

The imaging apparatus according to (8), in which the exposure amount controller synchronizes exposure amounts and exposure timings of the plurality of images shot by the first imaging section and exposure amounts and exposure timings of the plurality of images shot by the second imaging section with each other.

(10)

The imaging apparatus according to any one of (1) to (9), in which the second imaging section sequentially shoots a plurality of images including the second image, the first image is an image that is first shot of the plurality of images shot by the first imaging section, and the second image is an image that is first shot of the plurality of images shot by the second imaging section.

(11)

The imaging apparatus according to any one of (1) to (10), in which the first image and the second image are images having parallax therebetween, and the characteristic amount calculator calculates a distance to a subject on the basis of parallax between the first image and the second image.

(12)

The imaging apparatus according to any one of (1) to (11), in which the exposure amount controller controls exposure amounts of the first imaging section and the second imaging section on the basis of a synthesized luminance value calculated from a luminance value of the first image and a luminance value of the second image.

(13)

The imaging apparatus according to any one of (1) to (11), in which the exposure amount controller controls exposure amounts of the first imaging section and the second imaging section on the basis of one luminance value of a luminance value of the first image and a luminance value of the second image.

(14)

The imaging apparatus according to (13), in which the exposure amount controller controls the exposure amounts of the first imaging section and the second imaging section on the basis of a larger or smaller luminance value of the luminance value of the first image and the luminance value of the second image.

(15)

The imaging apparatus according to any one of (1) to (11), in which the exposure amount controller controls exposure amounts of the first imaging section and the second imaging section on the basis of an average luminance value of a luminance value of the first image and a luminance value of the second image.

(16)

The imaging apparatus according to any one of (1) to (11), in which the exposure amount controller divides each of the first image and the second image into a plurality of regions, and controls exposure amounts of the first imaging section and the second imaging section on the basis of a result of calculation of an average luminance value in each of the regions into which the first image is divided and an average luminance value in each of the regions into which the second image is divided.

(17)

An imaging method, including:

sequentially shooting a plurality of images including a first image by a first imaging section;

shooting at least one image including a second image by a second imaging section;

synthesizing the plurality of images shot by the first imaging section;

calculating a characteristic amount of a subject on the basis of the first image and the second image; and controlling the first imaging section and the second imaging section to reduce a difference between an exposure amount of the first image and an exposure amount of the second image.

This application claims the benefit of Japanese Priority Patent Application No. 2016-094602 filed with the Japan Patent Office on May 10, 2016, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. An imaging apparatus, comprising:
a first imaging section configured to sequentially shoot a plurality of first images including a first image;
a second imaging section configured to sequentially shoot a plurality of second images including a second image;
a signal processor configured to synthesize the plurality of first images shot by the first imaging section;
a characteristic amount calculator configured to calculate a characteristic amount of a subject based on the first image and the second image; and
an exposure amount controller configured to:
convert a mode of operation of one of the first imaging section or the second imaging section between a wide dynamic range mode and a flicker mode based on a presence of flicker; and
control the first imaging section such that an exposure amount of the first image is substantially equal to an exposure amount of the second image in a case where the first imaging section is in the flicker mode and the second imaging section is in the wide dynamic range mode.

2. The imaging apparatus according to claim 1, wherein the exposure amount controller is further configured to control the first imaging section and the second imaging section to reduce a difference between an exposure timing of the first image and an exposure timing of the second image.

3. The imaging apparatus according to claim 1, wherein the first image is an image that is first shot of the plurality of first images.

4. The imaging apparatus according to claim 1, wherein
   the exposure amount controller is further configured to control the first imaging section to cause different exposure amounts of the plurality of first images, and
   the signal processor is further configured to synthesize the plurality of first images that has different exposure amounts to generate a synthesized image having an enlarged dynamic range.

5. The imaging apparatus according to claim 1, wherein
   the exposure amount controller is further configured to control the first imaging section to cause equal exposure amounts of the plurality of first images, and
   the signal processor is further configured to synthesize the plurality of first images that has equal exposure amounts to generate a synthesized image in which the flicker is suppressed.

6. The imaging apparatus according to claim 1, wherein the exposure amount controller is further configured to control the first imaging section to cause one of equal exposure amounts or different exposure amounts of the plurality of first images based on a result of flicker detection.

7. The imaging apparatus according to claim 1, wherein the signal processor is further configured to:
   synthesize the plurality of first images shot by the first imaging section to generate a first synthesized image; and
   synthesize the plurality of second images shot by the second imaging section to generate a second synthesized image.

8. The imaging apparatus according to claim 7, wherein the characteristic amount calculator is further configured to calculate the characteristic amount of the subject based on the first synthesized image and the second synthesized image.

9. The imaging apparatus according to claim 8, wherein the exposure amount controller is further configured to synchronize exposure amounts and exposure timings of the plurality of first images shot by the first imaging section and exposure amounts and exposure timings of the plurality of second images shot by the second imaging section respectively.

10. The imaging apparatus according to claim 1, wherein
    the second image is an image that is first shot of the plurality of second images shot by the second imaging section.

11. The imaging apparatus according to claim 1, wherein
    the first image and the second image are having parallax therebetween, and
    the characteristic amount calculator is further configured to calculate a distance to the subject based on the parallax between the first image and the second image.

12. The imaging apparatus according to claim 1, wherein the exposure amount controller is further configured to control exposure amounts of the first imaging section and the second imaging section based on a synthesized luminance value calculated from a first luminance value of the first image and a second luminance value of the second image.

13. The imaging apparatus according to claim 1, wherein the exposure amount controller is further configured to control exposure amounts of the first imaging section and the second imaging section based on at least one of a first luminance value of the first image or a second luminance value of the second image.

14. The imaging apparatus according to claim 13, wherein the exposure amount controller is further configured to control the exposure amounts of the first imaging section and the second imaging section based on at least one of a larger luminance value or a smaller luminance value selected from at least one of the first luminance value of the first image or the second luminance value of the second image.

15. The imaging apparatus according to claim 1, wherein the exposure amount controller is further configured to control exposure amounts of the first imaging section and the second imaging section based on an average luminance value of a first luminance value of the first image and a second luminance value of the second image.

16. The imaging apparatus according to claim 1, wherein the exposure amount controller is further configured to:
    divide each of the first image and the second image into a plurality of regions; and
    control exposure amounts of the first imaging section and the second imaging section based on a result of calculation of an average luminance value in each of the plurality of regions into which the first image is divided and an average luminance value in each of the plurality of regions into which the second image is divided.

17. An imaging method, comprising:
    sequentially shooting a plurality of first images including a first image by a first imaging section;
    sequentially shooting a plurality of second images including a second image by a second imaging section;
    synthesizing the plurality of first images shot by the first imaging section;
    calculating a characteristic amount of a subject based on the first image and the second image; and
    converting a mode of operation of one of the first imaging section or the second imaging section between a wide dynamic range mode and a flicker mode based on a presence of flicker; and
    controlling the first imaging section such that an exposure amount of the first image is substantially equal to an exposure amount of the second image in a case where the first imaging section is in the flicker mode and the second imaging section is in the wide dynamic range mode.

18. The imaging apparatus according to claim 1, wherein the exposure amount controller is further configured to:
    control the first imaging section to cause an equal exposure amount of each of the plurality of first images in a case where the first imaging section is in the flicker mode; and
    control the second imaging section to cause a different exposure amount of each of the plurality of second images in a case where the second imaging section is in the wide dynamic range mode.

* * * * *